United States Patent
Hammarskjold et al.

(10) Patent No.: US 9,840,204 B2
(45) Date of Patent: Dec. 12, 2017

(54) VEHICLE SEAT WITH ADJUSTABLE SEAT BACK AND MULTIPLE RESTRAINT RELEASE MECHANISM

(71) Applicant: USSC GROUP, INC., Exton, PA (US)

(72) Inventors: Christian Ulfsson Hammarskjold, Exton, PA (US); Jeff David Krueger, Exton, PA (US); Matthew C. Gross, Exton, PA (US); Jason Lee Mort, Exton, PA (US)

(73) Assignee: USSC GROUP, INC., Exton, PA (US)

( * ) Notice: Subject to any disclaimer, the term of this patent is extended or adjusted under 35 U.S.C. 154(b) by 0 days.

(21) Appl. No.: 14/395,329

(22) PCT Filed: Apr. 18, 2013

(86) PCT No.: PCT/US2013/037222
§ 371 (c)(1),
(2) Date: Oct. 17, 2014

(87) PCT Pub. No.: WO2013/158911
PCT Pub. Date: Oct. 24, 2013

(65) Prior Publication Data
US 2015/0069800 A1     Mar. 12, 2015

Related U.S. Application Data

(60) Provisional application No. 61/635,161, filed on Apr. 18, 2012.

(51) Int. Cl.
| | |
|---|---|
| B60R 22/32 | (2006.01) |
| B60N 2/18 | (2006.01) |
| B60R 7/04 | (2006.01) |
| A62B 25/00 | (2006.01) |
| A62B 9/04 | (2006.01) |
| B60N 2/64 | (2006.01) |
| B60N 2/24 | (2006.01) |
| B60N 2/22 | (2006.01) |

(Continued)

(52) U.S. Cl.
CPC ............... *B60R 7/043* (2013.01); *A62B 9/04* (2013.01); *A62B 25/00* (2013.01); *B60N 2/22* (2013.01); *B60N 2/2213* (2013.01); *B60N 2/24* (2013.01); *B60N 2/643* (2013.01); *B60R 22/12* (2013.01); *B60R 2022/005* (2013.01)

(58) Field of Classification Search
CPC .................................................... B60R 22/325
USPC ............................... 297/354.1, 353, 383, 368
See application file for complete search history.

(56) References Cited

U.S. PATENT DOCUMENTS

| | | | |
|---|---|---|---|
| 4,118,053 A * | 10/1978 | Neveux ................. | B60R 22/325 280/807 |
| 5,987,717 A | 11/1999 | Peterson et al. | |
| 6,601,923 B2 | 8/2003 | Pond et al. | |

(Continued)

*Primary Examiner* — Timothy J Brindley
(74) *Attorney, Agent, or Firm* — Drinker Biddle & Reath LLP

(57) ABSTRACT

Provided is a design for an emergency vehicle seat equipped with an adjustable seat back assembly and a multiple restraint release mechanism for simultaneously releasing multiple seat belt restraints while also releasing a bracket member of a mounting apparatus to enable the release of a cylindrical tank being transported in the vehicle seat. The tank is a part of a self-contained breathing apparatus (SCBA) worn on the back of the occupant of the vehicle seat.

7 Claims, 24 Drawing Sheets

(51) Int. Cl.
*B60R 22/12* (2006.01)
*B60R 22/00* (2006.01)

(56) References Cited

U.S. PATENT DOCUMENTS

| | | | |
|---|---|---|---|
| 6,655,745 B2 | 12/2003 | Fohrenkamm et al. | |
| 7,387,338 B2 * | 6/2008 | Beranek | B60N 2/203 297/283.3 |
| 7,503,535 B2 * | 3/2009 | Ziaylek | A62B 9/04 248/313 |
| 7,931,337 B2 * | 4/2011 | Lawall | B60N 2/22 297/354.12 |
| 7,975,978 B2 * | 7/2011 | Ziaylek | B60R 7/043 248/154 |
| 8,052,209 B2 | 11/2011 | Bostrom et al. | |
| 8,152,123 B2 * | 4/2012 | Ziaylek | A62B 9/04 248/311.2 |
| 8,220,764 B2 * | 7/2012 | Ziaylek | A62B 25/00 224/275 |
| 9,004,606 B2 * | 4/2015 | Bostrom | B60N 2/688 297/464 |
| 2008/0018156 A1 * | 1/2008 | Hammarskjold | B60N 2/688 297/354.1 |
| 2009/0127416 A1 | 5/2009 | Ziavlek | |
| 2010/0101060 A1 * | 4/2010 | Walega | A44B 11/2523 24/603 |
| 2015/0145238 A1 * | 5/2015 | Park | B60R 22/4633 280/806 |
| 2015/0258955 A1 * | 9/2015 | Jayasuriya | B60R 22/023 297/353 |

* cited by examiner

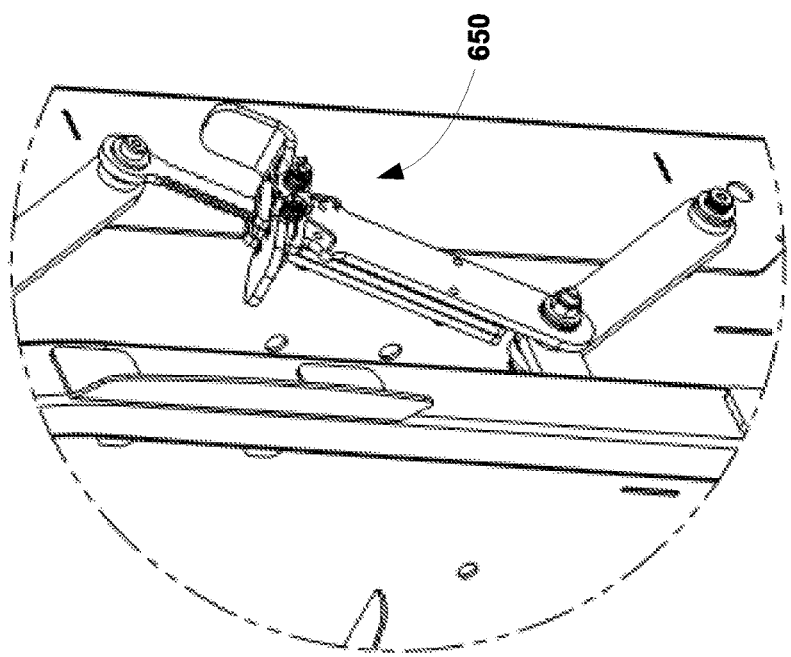
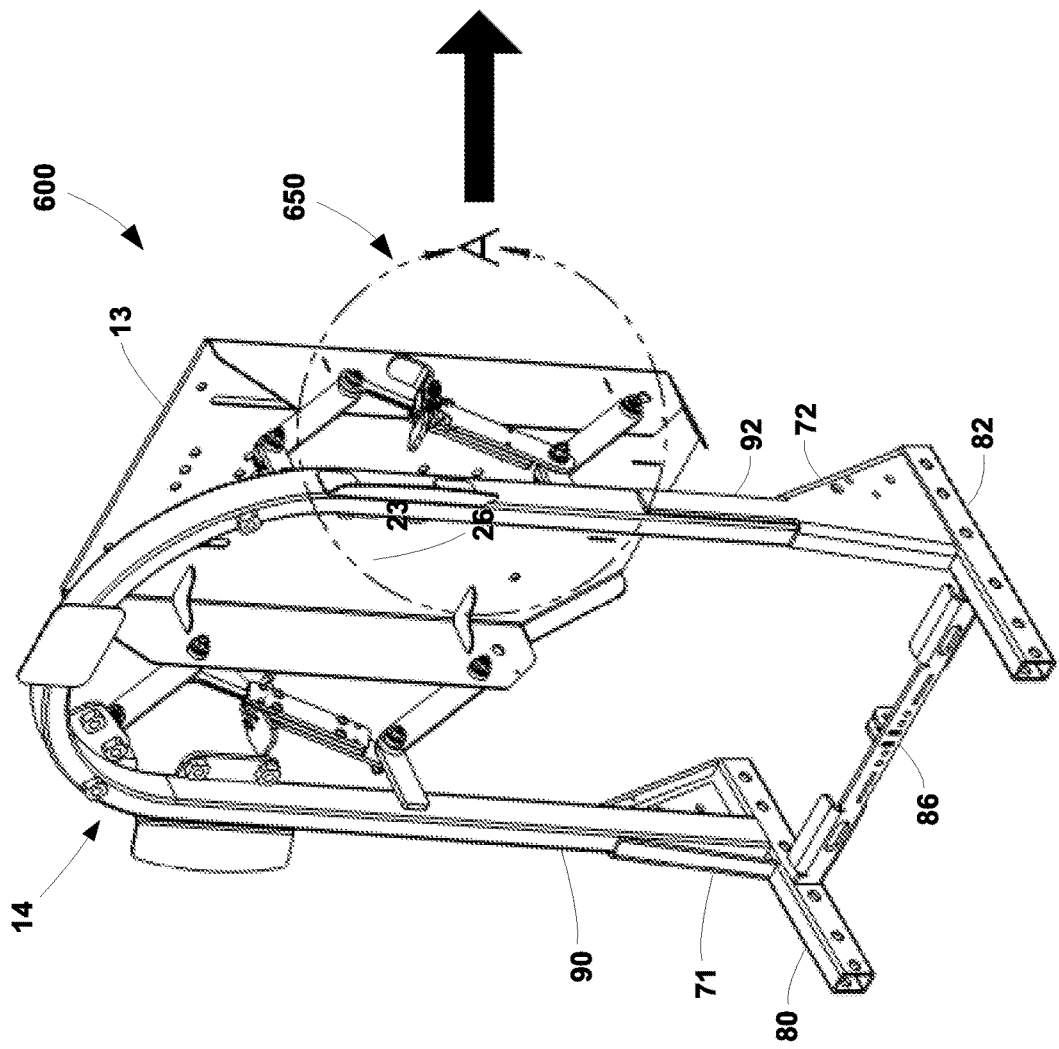
FIG. 15
FIG. 14

VEHICLE SEAT WITH ADJUSTABLE SEAT BACK AND MULTIPLE RESTRAINT RELEASE MECHANISM

CROSS REFERENCE TO RELATED APPLICATIONS

This application is the National Phase of PCT/US2013/037222 filed on Apr. 18, 2013, which claims priority under 35 U.S.C. 119(e) to U.S. Provisional Application No. 61/635,161 filed on Apr. 18, 2012, all of which are hereby expressly incorporated by reference into the present application.

TECHNICAL FIELD

The present disclosure relates generally to vehicle seats. More particularly, aspects of the present disclosure relate to an emergency vehicle seat with an adjustable seat back assembly and a multiple restraint release mechanism.

BACKGROUND

Emergency vehicles, such as fire trucks, often travel at high speeds and through crowded roadways to get to the destination where help is needed. A variety of safeguards are put in place to ensure that the emergency personnel being transported in these vehicles are shielded from potential causes of injury that can arise in such an environment. For example, seats in emergency vehicles have been constructed to maintain a tank that is part of a self-contained breathing apparatus (SCBA) in an upright vertical position during transport. The SCBA is worn on the back of the seat occupant, and such seat constructions prevent the tank from being propelled around the inside of the vehicle during high-speed transport or in the case of an accident.

In addition to ensuring the safety of emergency personnel during transport, it is also important to provide such personnel with the ability to quickly disengage themselves from the vehicle seats and exit the vehicle with their SCBA in the correct position and ready for use.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a seat assembly for a vehicle, the seat assembly comprising: a base; a seat back extending up from the base, the seat back including a central recess housing a support assembly for supporting a cylindrical tank in the central recess; a seat belt assembly comprising at least two seat belts, a latch attached to each seat belt, and a corresponding buckle, wherein each buckle releasably engages each corresponding latch in a corresponding housing; and a release mechanism located remote from each housing and remote from the support assembly housed in the central recess, the release mechanism being selectively operative to enable release of the cylindrical tank from an engaged position and release of each seat belt latch from its corresponding buckle.

In another embodiment, the seat assembly further comprises an adjustable seat back member connected with the seat back, wherein the adjustable seat back member automatically adjusts and locks to a depth based on pressure exerted by an occupant of the seat.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

FIG. 14 is a perspective view of a portion of an emergency vehicle seat having an adjustable seat back assembly according to one or more embodiments described herein.

FIG. 15 is an enlarged view of a portion of the adjustable seat back assembly shown in FIG. 14.

Figure 1:
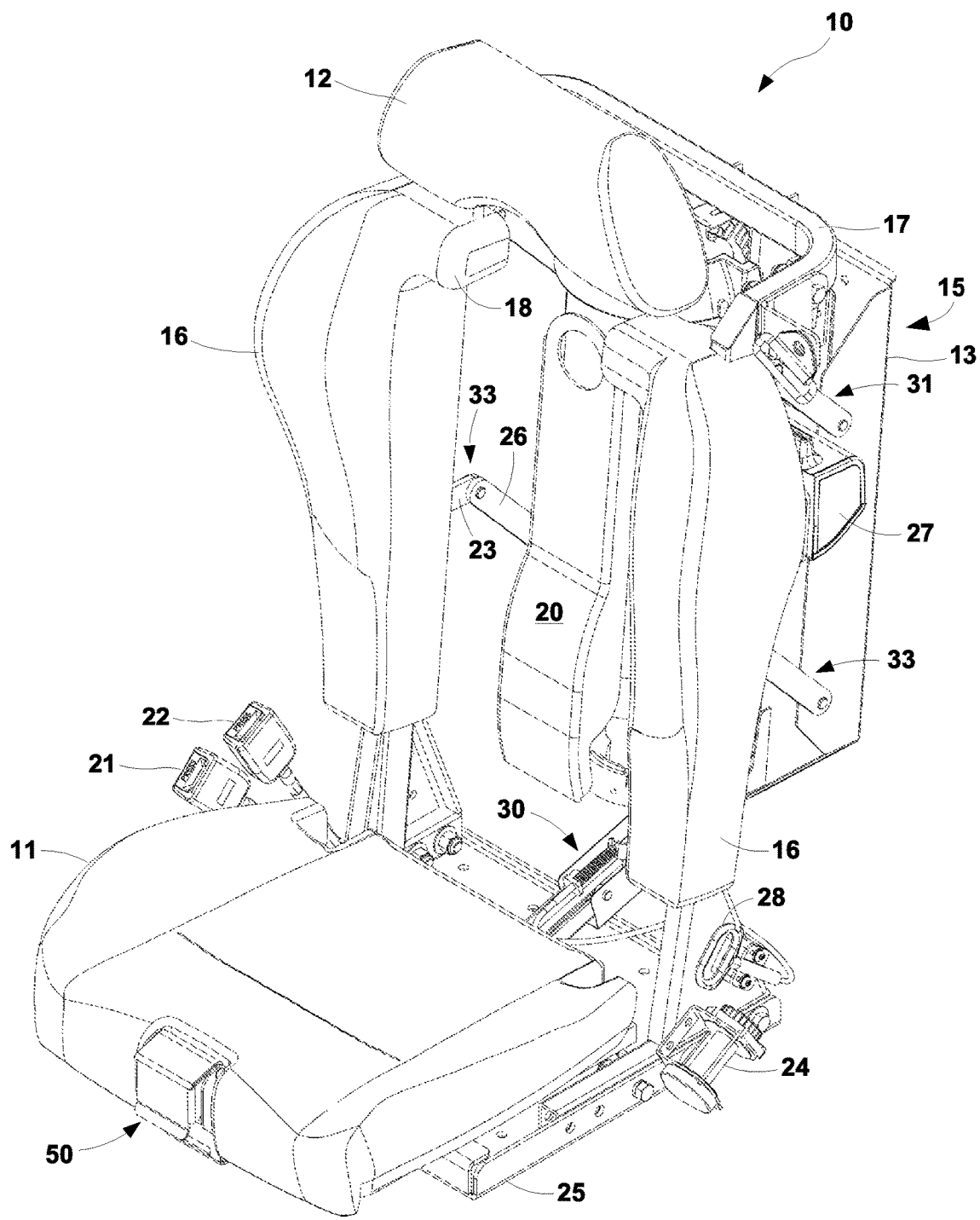
FIG. 1 is a perspective view of an emergency vehicle seat with an adjustable seat back assembly and a multiple restraint release mechanism according to an embodiment described herein.

The headings provided herein are for convenience only and do not necessarily affect the scope or meaning of the claimed embodiments.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Embodiments of the present disclosure relate to an emergency vehicle seat equipped with an adjustable seat back assembly and a multiple restraint release mechanism for simultaneously releasing multiple seat belt restraints while also releasing a bracket member of a mounting apparatus to enable the release of a cylindrical tank being transported in the vehicle seat. The tank is a part of a self-contained breathing apparatus (SCBA) worn on the back of the occupant of the vehicle seat. Such tanks may be mounted in the back portions of the vehicle seat to provide a secure means of retaining the tank in place while it is being worn by the occupant of the seat. This is particularly important when the occupant is being transported by an emergency vehicle traveling at high speeds, such as a fire truck or ambulance.

Referring to the drawings, FIGS. 1-5 illustrate an emergency vehicle seat 10 that has particular utility in fire and rescue vehicles. The seat 10 includes a frame 14 interconnected with an adjustable seat back assembly 15 and a seat base 25. The frame 14 has a pair of spaced apart lower horizontal frame members 80 and 82, a pair of spaced apart vertical frame members 90 and 92 that extend upwardly from the lower horizontal frame members 80 and 82, and a generally U-shaped upper horizontal frame member 17 that extends rearwardly from the vertical frame members 90 and 92. The frame 14 also includes a pair of gussets 71 and 72 that are rigidly joined between the lower ends of the vertical frame members 90 and 92 and the respective rearward portions of the lower horizontal frame members 80 and 82. The vertical frame members 90 and 92 are combined with the headrest mounting bars 19 (only one headrest mounting bar visible in FIG. 2) that extend towards one another and perpendicular to the vertical frame members 90 and 92. A cross member 86 is rigidly joined between the lower horizontal frame members 80 and 82, and includes an attachment clip for attaching the frame 14 to the seat base 25.

The seat base 25 is for supporting a seat cushion 11. The adjustable seat back assembly 15 includes a back panel 13 that is connected to the vertical frame members 90 and 92 by a pair of upper hinges 31 and a pair of lower hinges 33. Each of the upper and lower hinges 31 and 33 includes a horizontal hinge member 23 and a traverse hinge member 26. The horizontal hinge member 23 is fastened at its non-hinging end to one of the vertical frame members 90 or 92 and the corresponding traverse hinge member 26 is fastened at its non-hinging end to the back panel 13 of the adjustable seat back assembly 15. The vertical frame members 90 and 92, the upper horizontal frame member 17, the back panel 13 of the adjustable seat back assembly 15, and the upper and lower hinges 31 and 33 together form a central recess that houses a mounting assembly 40 for supporting a cylindrical tank 36 in the central recess. The cylindrical tank 36 is a part of a self-contained breathing apparatus (SCBA) that may also include a contoured tank attachment 20 that provides a more comfortable fit against the back of an individual wearing the SCBA.

Figure 2:
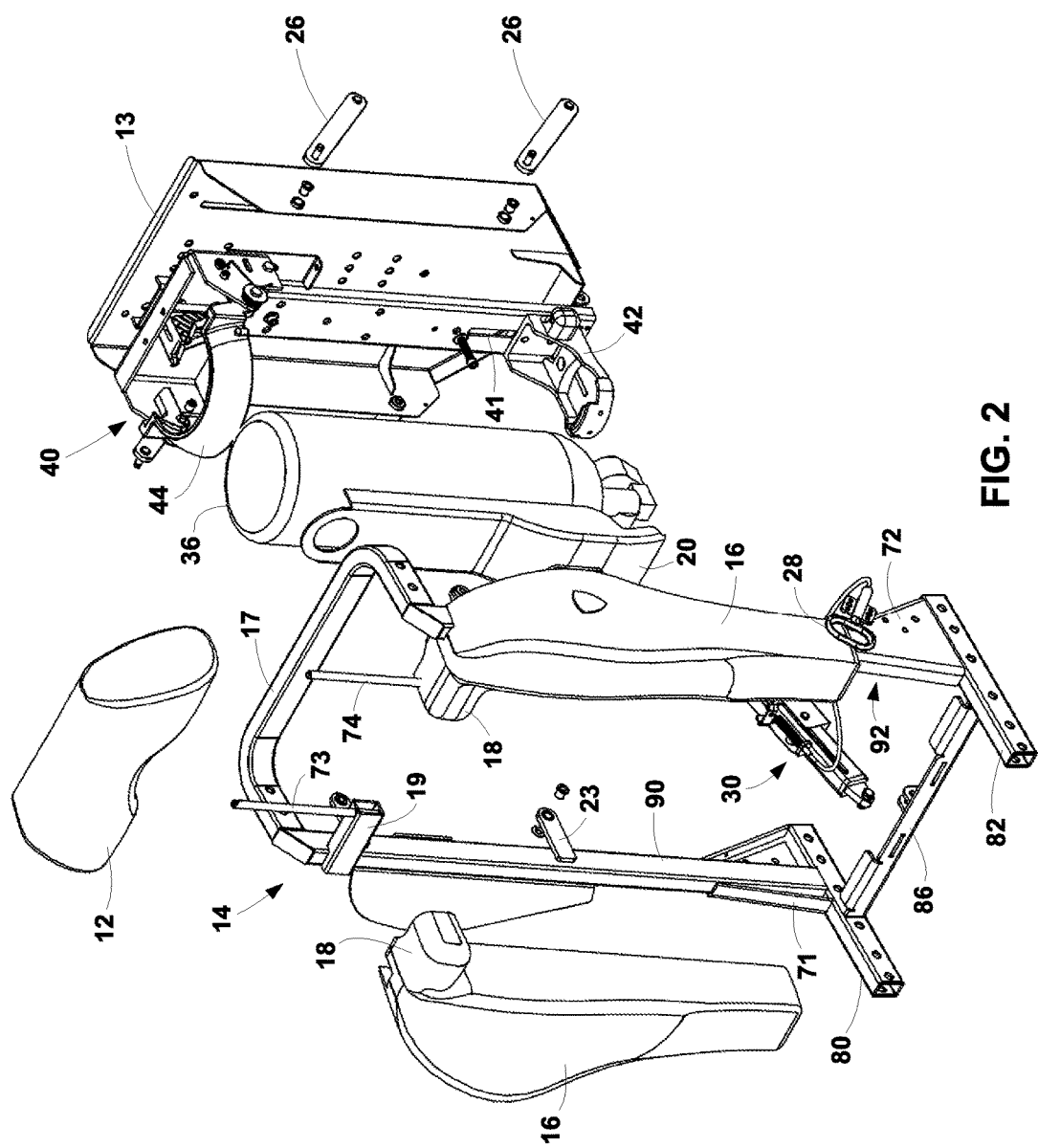
FIG. 2 is an exploded view of the emergency vehicle seat shown in FIG. 1, with a lower portion of the emergency vehicle seat removed.
Figure 3:
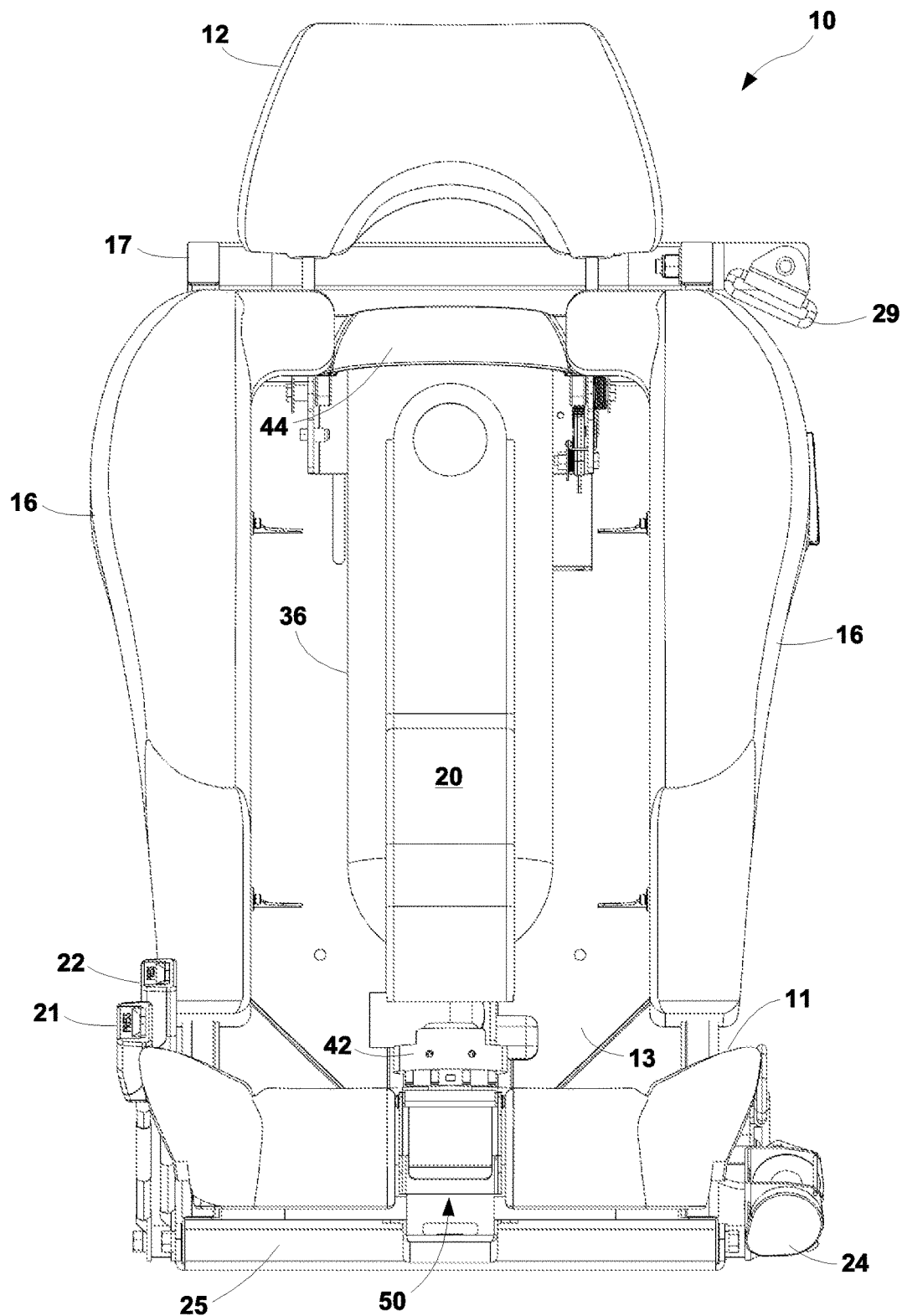
FIG. 3 is a front elevation view of the emergency vehicle seat shown in FIG. 1.
Figure 4:
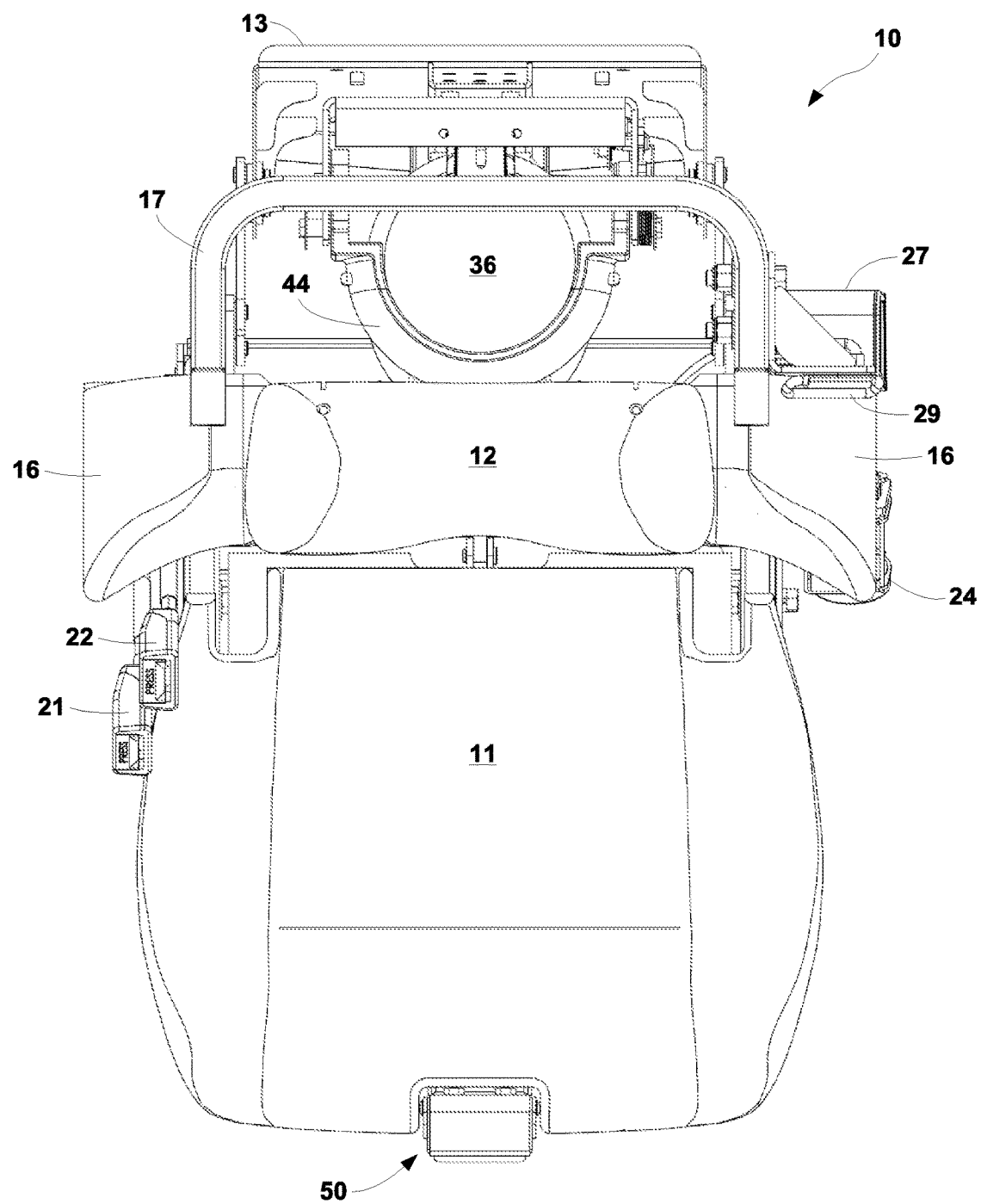
FIG. 4 is a top view of the emergency vehicle seat shown in FIG. 1.
Figure 5:
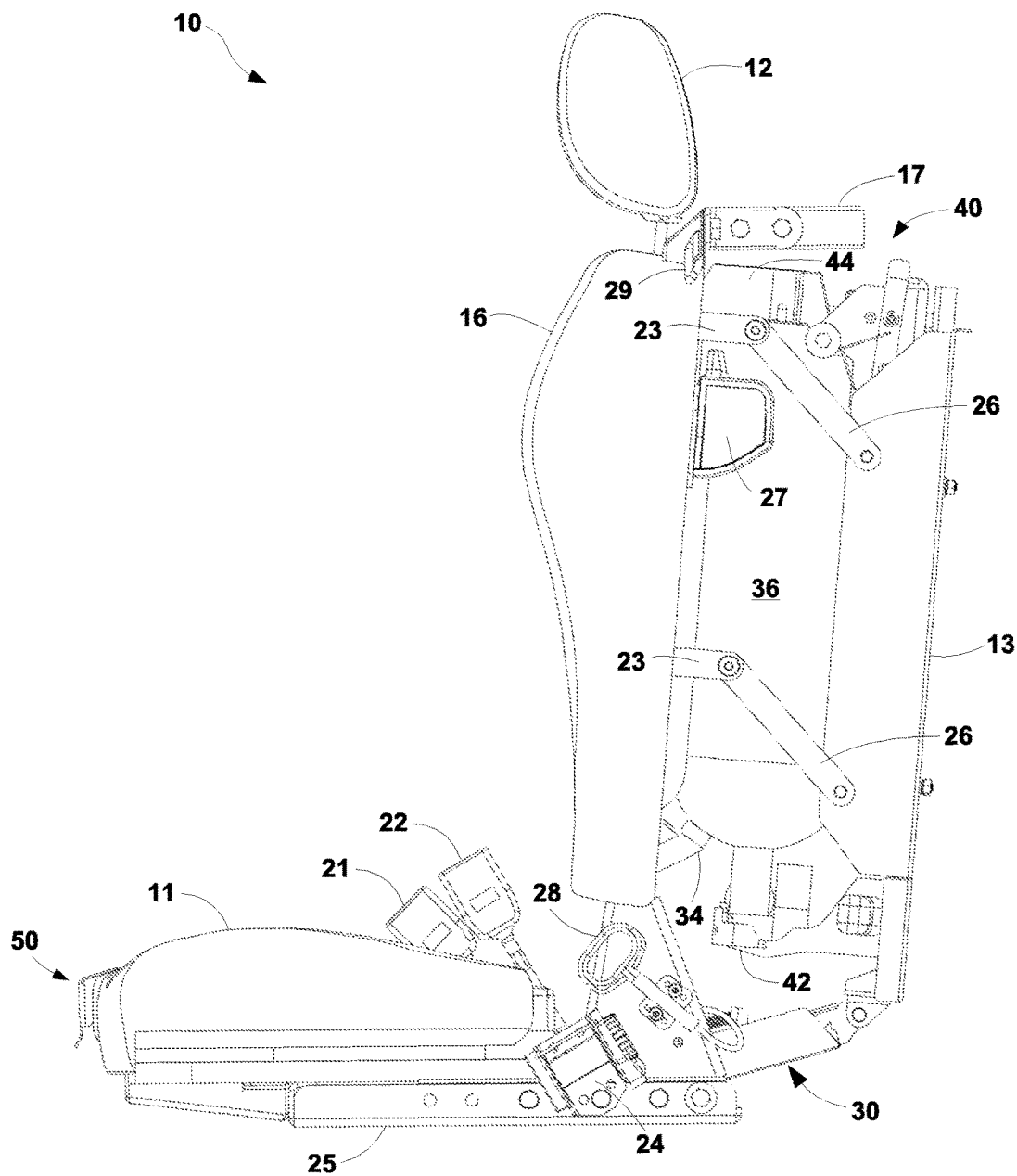
FIG. 5 is a side elevation view of the emergency vehicle seat shown in FIG. 1.
Figure 6:
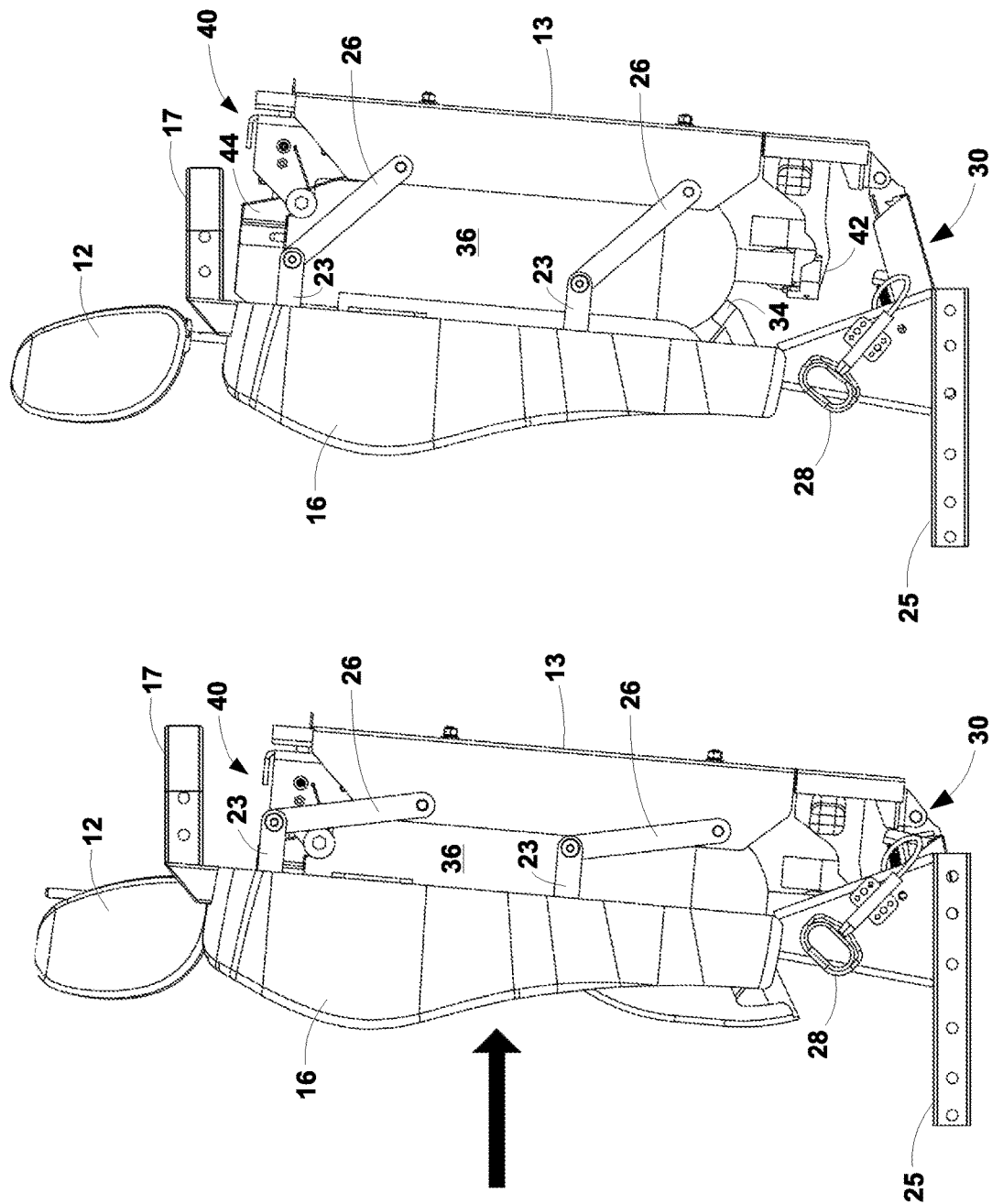
FIG. 6 is a side elevation view of the emergency vehicle seat shown in FIG. 1, showing the adjustable seat back in an extended position and a relaxed position according to one or more embodiments described herein.

Referring to FIG. 2, the seat 10 includes a headrest assembly 12 that mounts to a pair of spaced apart headrest members 73 and 74 that provide vertical adjustment to the headrest assembly 12. The headrest members 73 and 74 are mounted to the headrest mounting bars 19 which extend inwards from the vertical frame members 90 and 92.

Figure 32:
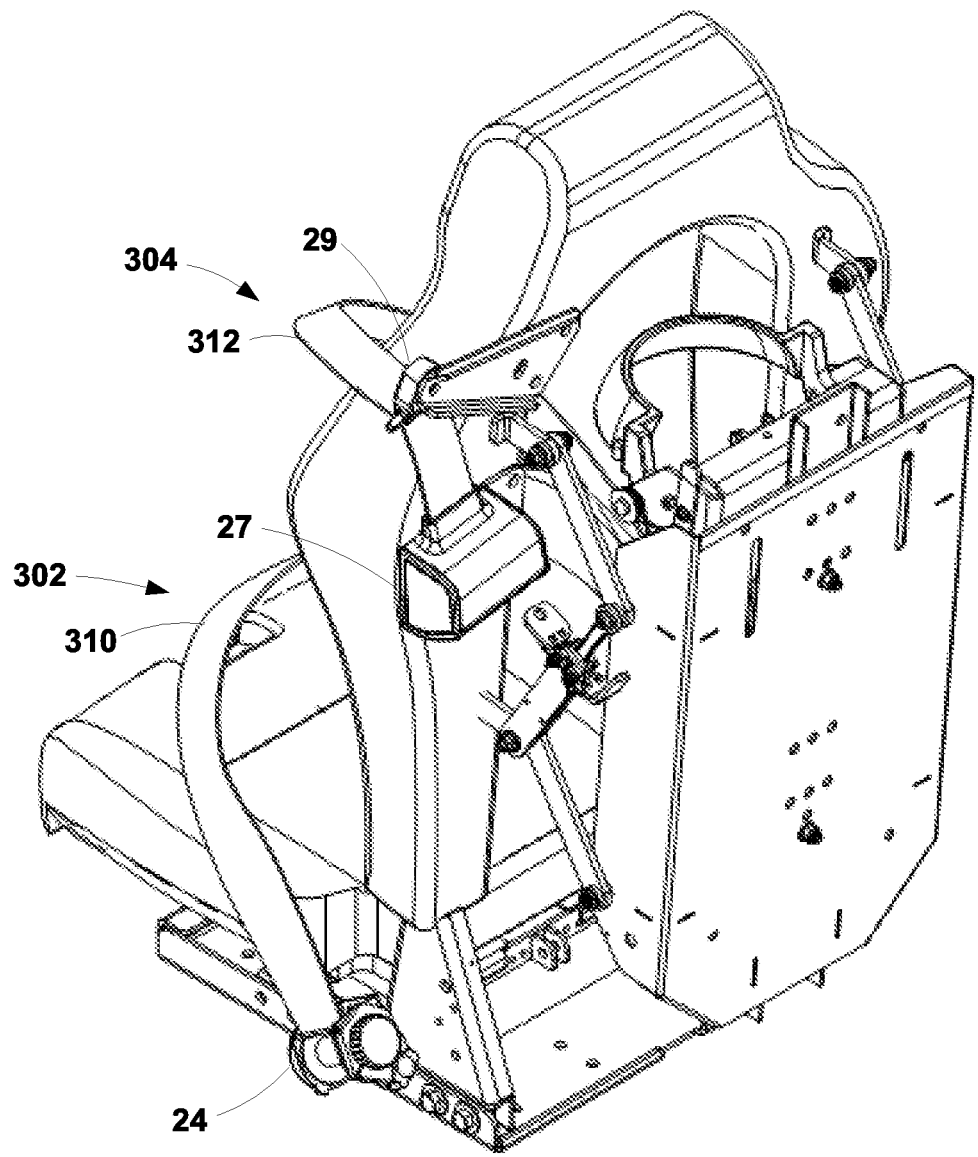
FIG. 32 is a back perspective view of an emergency vehicle seat having multiple restraints according to one or more embodiments described herein.
Figure 33:
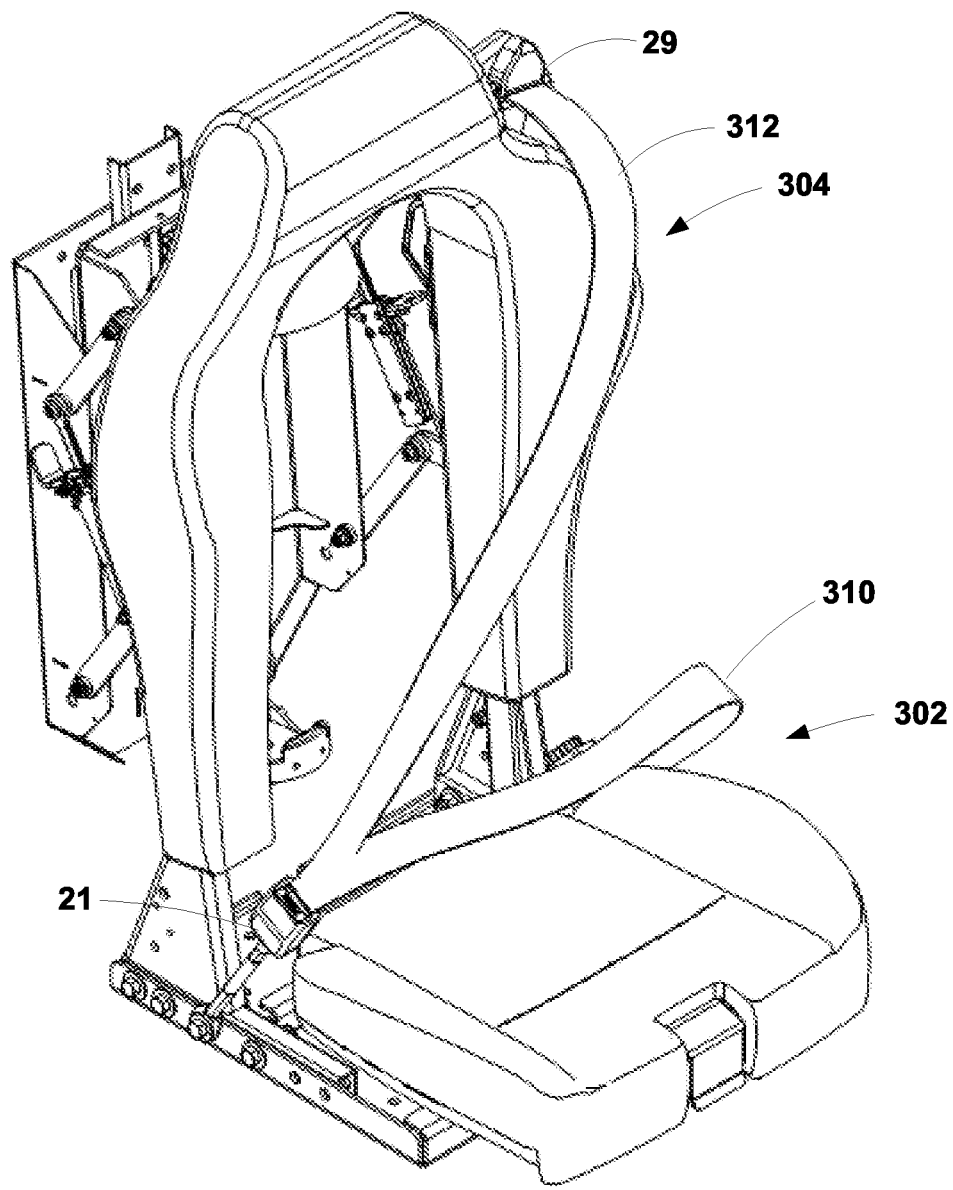
FIG. 33 is a front perspective view of an emergency vehicle seat having multiple restraints according to one or more embodiments described herein.

Referring to FIGS. 32 and 33, the emergency vehicle seat 10 is equipped with a lower seat belt assembly 302 and an upper seat belt assembly 304. The lower seat belt assembly 302 includes a lower seat belt reel 24 mounted to the seat base 25, a first lower buckle member (shown as inserted), a second lower buckle member 21, and a lower belt 310. The upper seat belt assembly 304 includes an upper seat belt reel 27 mounted on the rearward-facing side of the vertical frame member 92, a guide member 29 fastened to an L-shaped piece mounted to the upper horizontal frame member 17, a first upper buckle member (shown as inserted), a second upper buckle member 22, and an upper belt 312. The upper and lower belts 312 and 310 have a first end spooled into the respective seat belt reels 27 and 24. The lower belt 310 extends up from the lower seat belt reel 24 and across the width of the seat cushion 11. The upper belt 312 extends up from the upper seat belt reel 27, is threaded through the guide member 29, and extends diagonally downwards across the seat 10.

In at least one embodiment, the upper and lower seat belt reels 27 and 24 each include an automatic belt retrieval mechanism (not shown) that automatically retrieves the respective belts 312 and 310 into the reels when the belts are not in use. As illustrated in FIGS. 32 and 33, the lower belt 310 extends across the lap of the occupant and the upper belt 312 extends over the left shoulder of the occupant. It should be noted that in any of the embodiments described herein, either or both of the upper and lower seat belt reels 27 and 24 can be mounted on the side of the seat 10 opposite to what is illustrated in FIGS. 32 and 33. The occupant may grasp the first lower buckle member (not visible), pull the lower belt 310 across the occupant's lap, and secure the first lower buckle member to the second lower buckle member 21. Similarly, the occupant may grasp the first upper buckle member (not visible), pull the upper belt 312 across the occupant's upper body, and secure the first upper buckle member to the second upper buckle member 22.

A particularly advantageous feature of the present disclosure is a multiple restraint release assembly 50 shown in the embodiments of the emergency vehicle seat 10 illustrated in FIGS. 1, 3-5, 7, and 8. The multiple restraint release assembly 50 is for simultaneously releasing the upper and lower seat belts (312 and 310) from being secured to the second upper and lower buckle members (22 and 21) when in use, while also releasing the tank 36 from a bracket member 44 of the mounting apparatus 40. The multiple restraint release assembly 50 is selectively operative to enable the release of the tank from an engaged position to an disengaged position relative to the bracket member 44 and mounting apparatus 40, such that the occupant of the seat can stand up and exit the seat while carrying the tank on his or her back.

Figure 7:
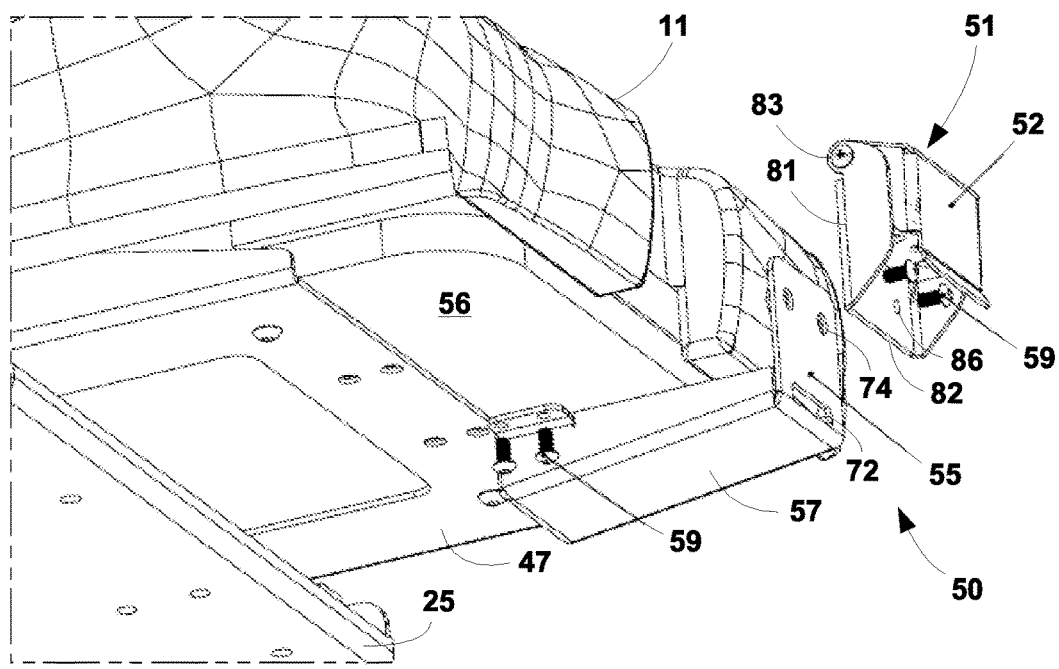
FIG. 7 is an exploded view of a lower portion of the emergency vehicle seat shown in FIG. 1, showing a portion of the multiple restraint release mechanism and the seat bottom according to an embodiment described herein.
Figure 8:
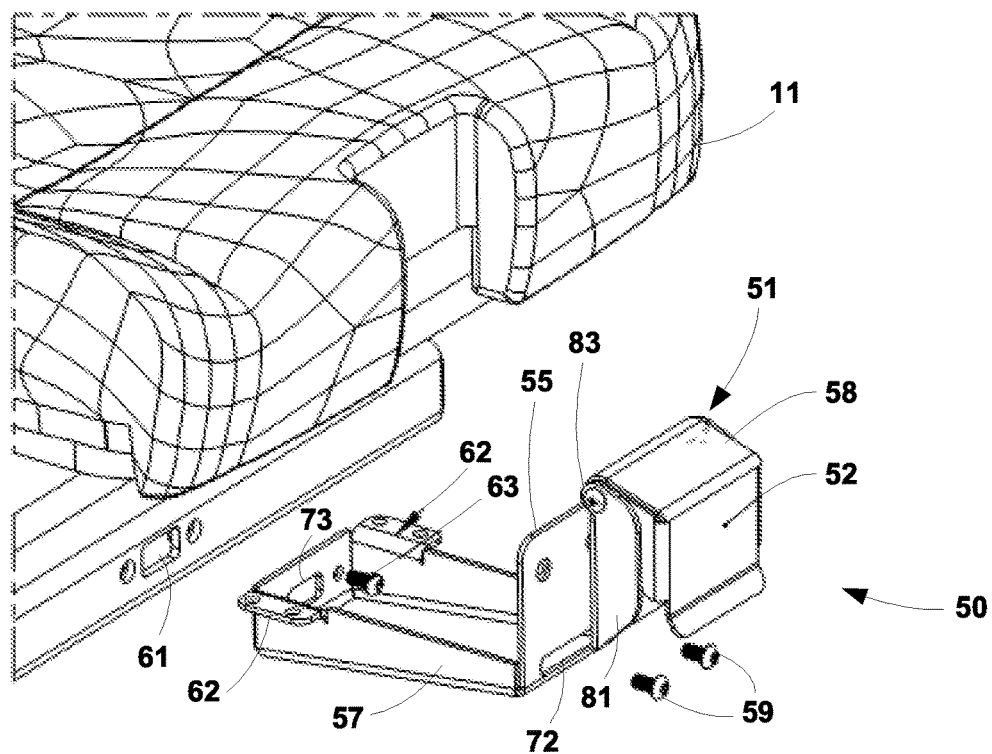
FIG. 8 is an exploded view of a lower portion of the emergency vehicle seat shown in FIG. 1, showing a portion of the multiple restraint release mechanism and the seat bottom according to an embodiment described herein.
Figure 9:
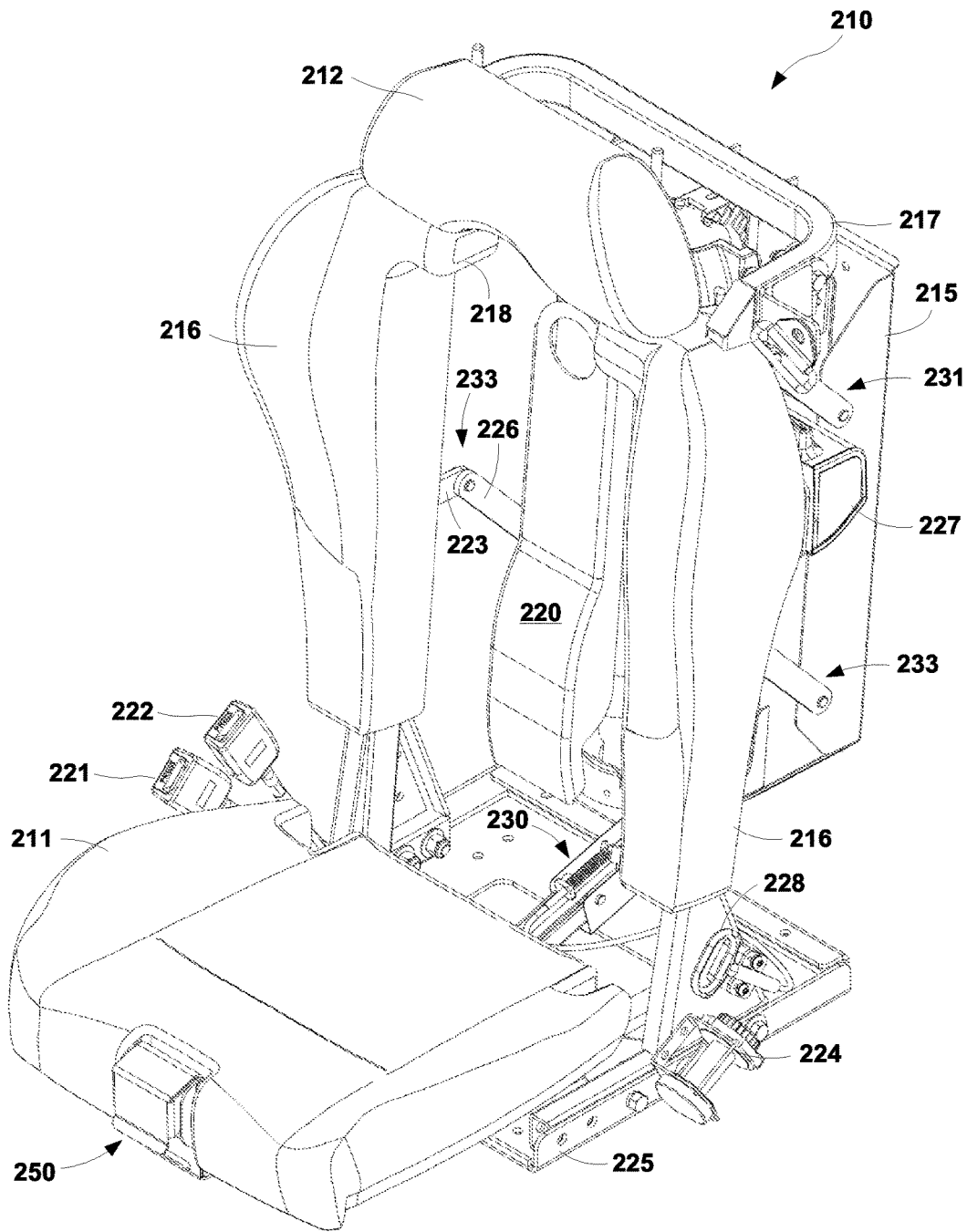
FIG. 9 is a perspective view of an emergency vehicle seat having a flip-up seat construction, and including an adjustable seat back assembly and multiple restraint release mechanism according to an embodiment described herein.

In at least one embodiment, the multiple restraint release assembly 50 is mounted on the seat base 25 as illustrated in FIGS. 7 and 8. The multiple restraint release assembly 50 includes release handle 51, which has a front panel 52, a top panel 58, a back panel 82 and side panels 81. The release handle 51 is fastened to release mounting plate 55 with fasteners 59 that insert through openings 86 in the back panel 82 of the release handle and through openings 74 in the mounting plate 55. The lower edge of front panel 52 can be grasped by the seat occupant and upon the occupant exerting outwards and upwards force (pulling) the top panel rotates about its upper axis 83 to cause the release of multiple seat belt restraints and a bracket member of a SCBA bracket. The release mounting plate 55 extends upwards from a release cable box 57 mounted on an extension piece 47 of the seat base 25.

The release cable box 57 is for guiding cables, wires, cords, or the like, that are operatively connected to the release handle 51 on one end and the second upper and lower buckle members (22 and 21) and the bracket member 44 of the mounting apparatus 40 on the other end. The release cable box 57 is mounted to the extension piece 47 of the seat base with fasteners 59 that pass through mounting faces 62 protruding outward from each of the sides of release cable box 57. Release cable box 57 also includes guide openings 72 and 73 through which the cables, wires, and the like pass, and which are aligned with guide opening 61 in the seat base 25.

The emergency vehicle seat 10 is further equipped with an adjustable seat back assembly 15 that automatically adjusts a level of support provided to the occupant based on the occupant's physical characteristics (e.g., height, weight, etc.) and automatically locks into position at the adjusted level of support. Referring to FIGS. 1 through 6, the adjustable seat back assembly 15 preferably is oriented extending generally vertically and generally the length of the cylindrical tank 36 housed in the central recess.

The adjustable seat back assembly 15 includes a seat back adjustment mechanism 30. In at least one embodiment, the seat back adjustment mechanism 30 includes a ratcheted seat back adjustment, which is of a similar construction, with similar functionality and features, as the ratchet assembly illustrated in FIGS. 21-29 and described in greater detail below. In another embodiment, the adjustable seat back assembly 15 includes a seat back adjustment mechanism 30 other than the ratcheted seat back adjustment, such as a spring-loaded seat back adjustment (not shown).

An occupant of the vehicle seat 10 can manually extend or recline the adjustable seat back assembly 15 by operating seat back adjustment handle 28. The adjustable seat back assembly 15 can include any number of adjustment locking points, and the distance between such locking points can be both finite and infinite.

FIGS. 15-19 illustrate an emergency vehicle seat according to another embodiment of the disclosure. The emergency vehicle seat 210 has a flip-up seat construction, and includes an adjustable seat back assembly 215 and a multiple restraint release mechanism 250. The adjustable seat back assembly 215 and the multiple restraint release mechanism 250 illustrated in FIGS. 15-19 is of a similar construction, and has similar functionality and features, as the adjustable seat back assembly 15 and multiple restraint release mechanism 50 included in the emergency vehicle seat 10 described above in connection with FIGS. 1-14. Additionally, the various other components illustrated in FIGS. 15-19 are of similar construction as, and have similar functionalities and features as their corresponding counterparts illustrated in FIGS. 1-14.

Figure 10:
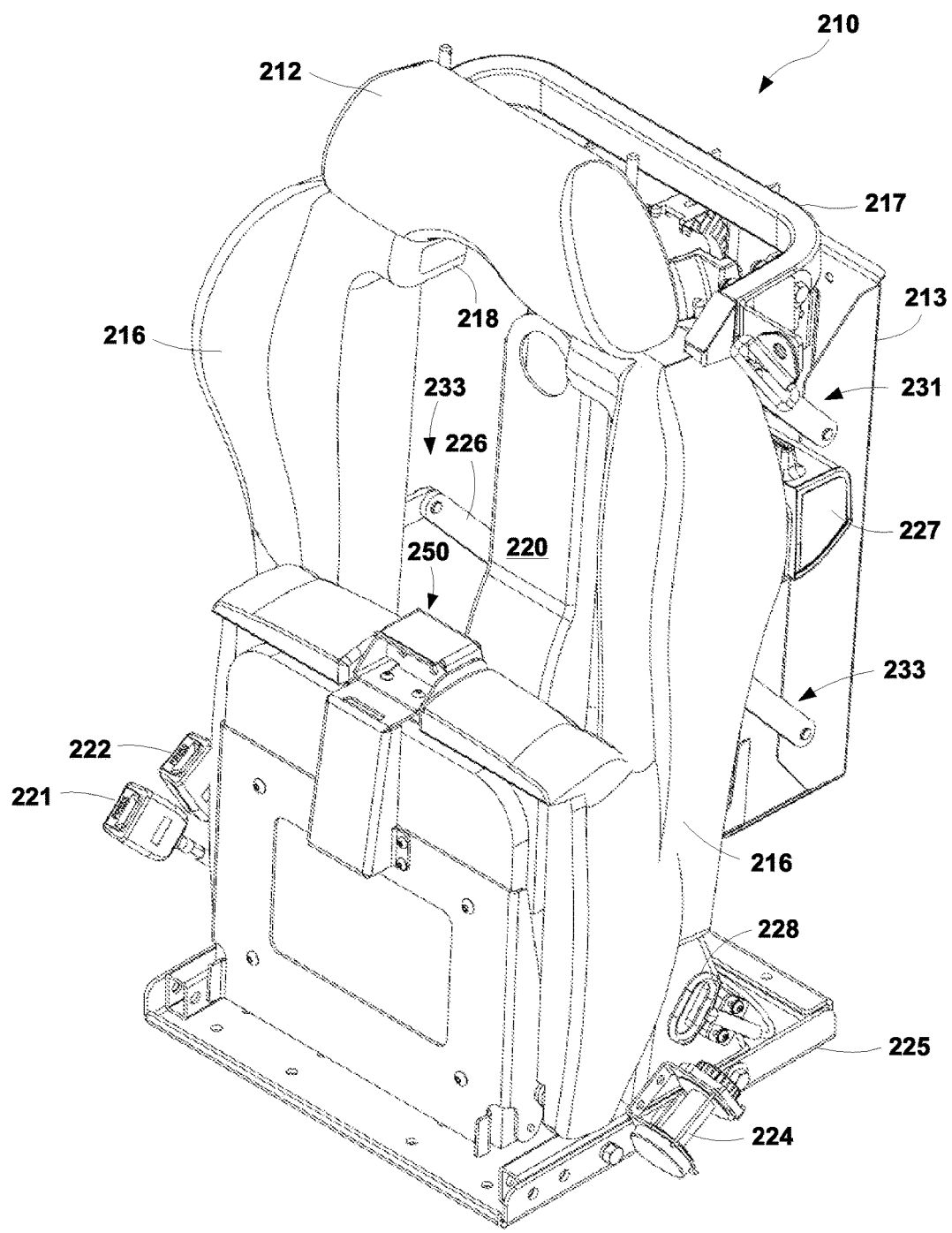
FIG. 10 is a perspective view of the emergency vehicle seat shown in FIG. 9, showing a portion of the seat bottom in a flipped-up position according to an embodiment described herein.
Figure 11:
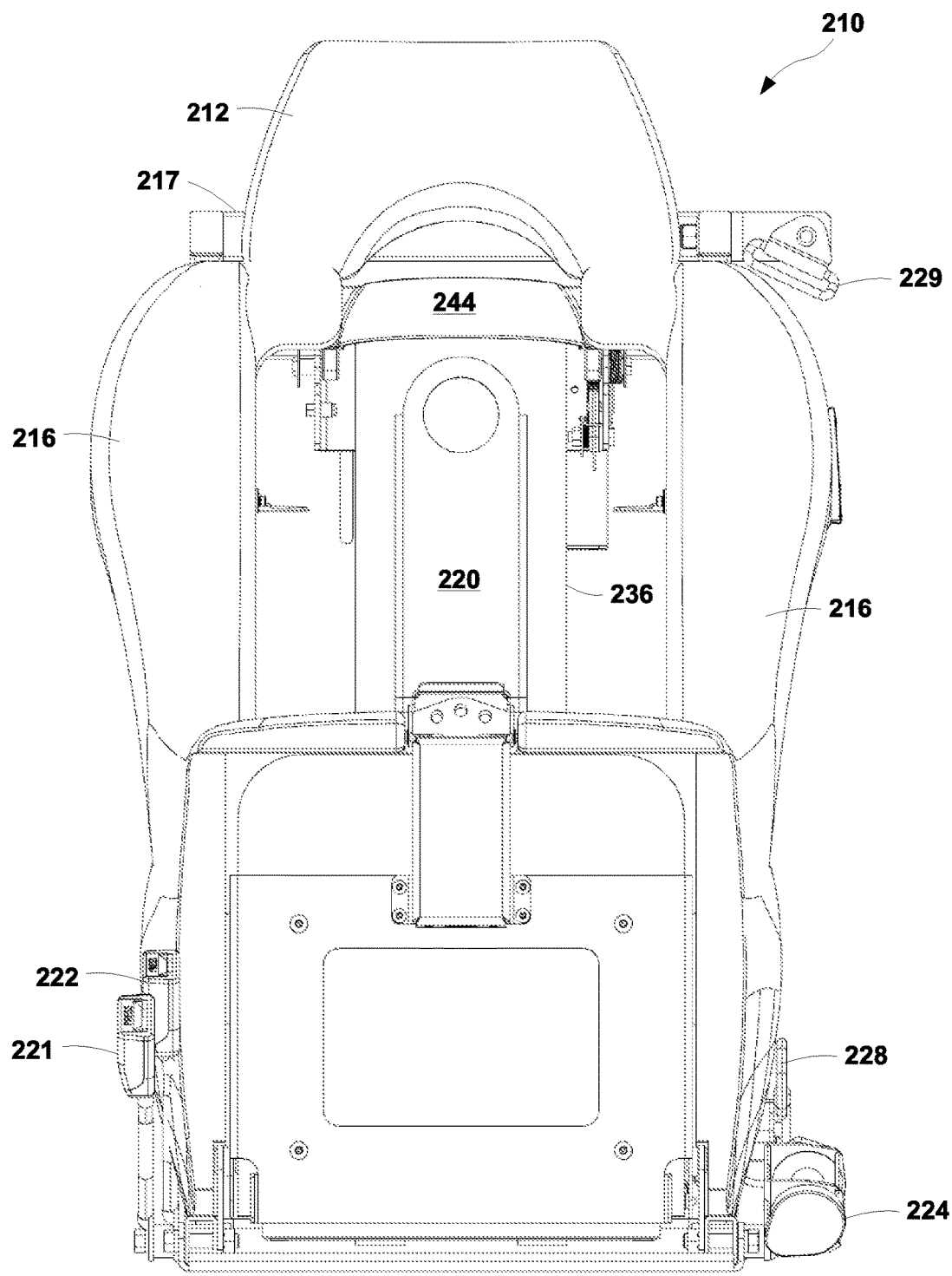
FIG. 11 is a front elevation view of the emergency vehicle seat shown in FIG. 10.
Figure 12:
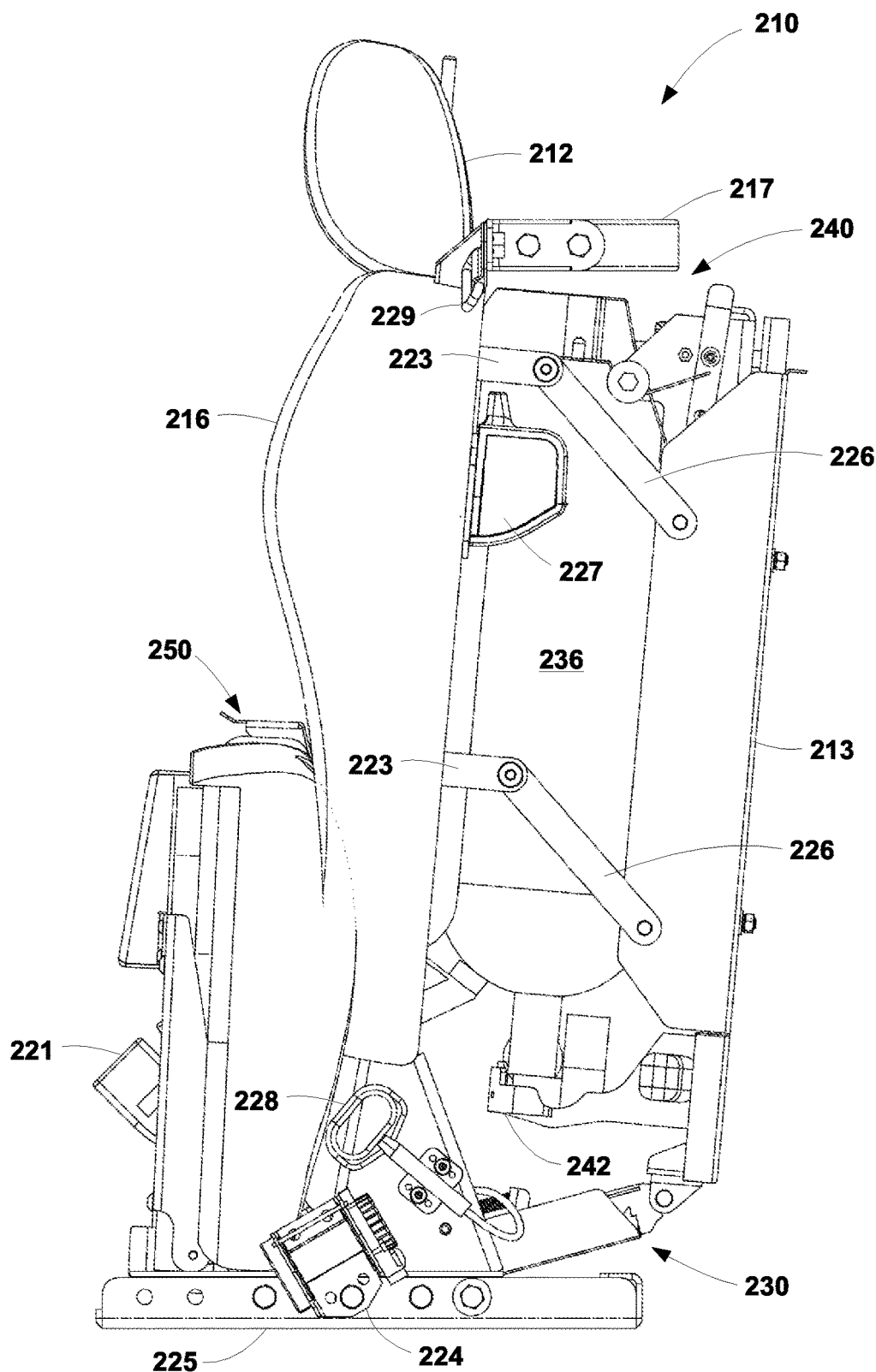
FIG. 12 is a side elevation view of the emergency vehicle seat shown in FIG. 10.
Figure 13:
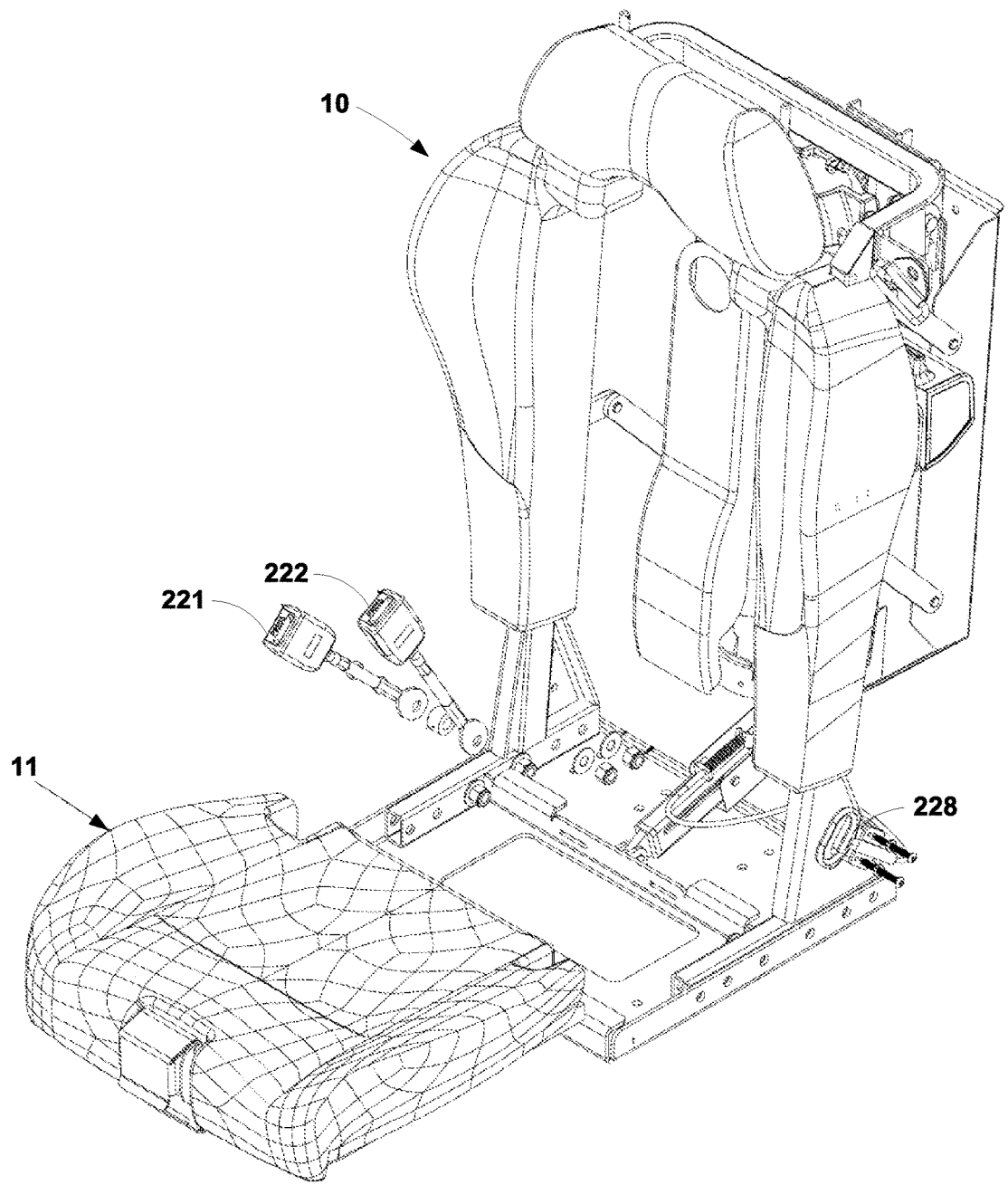
FIG. 13 is an exploded view of the emergency vehicle seat shown in FIG. 9.
Figure 17:
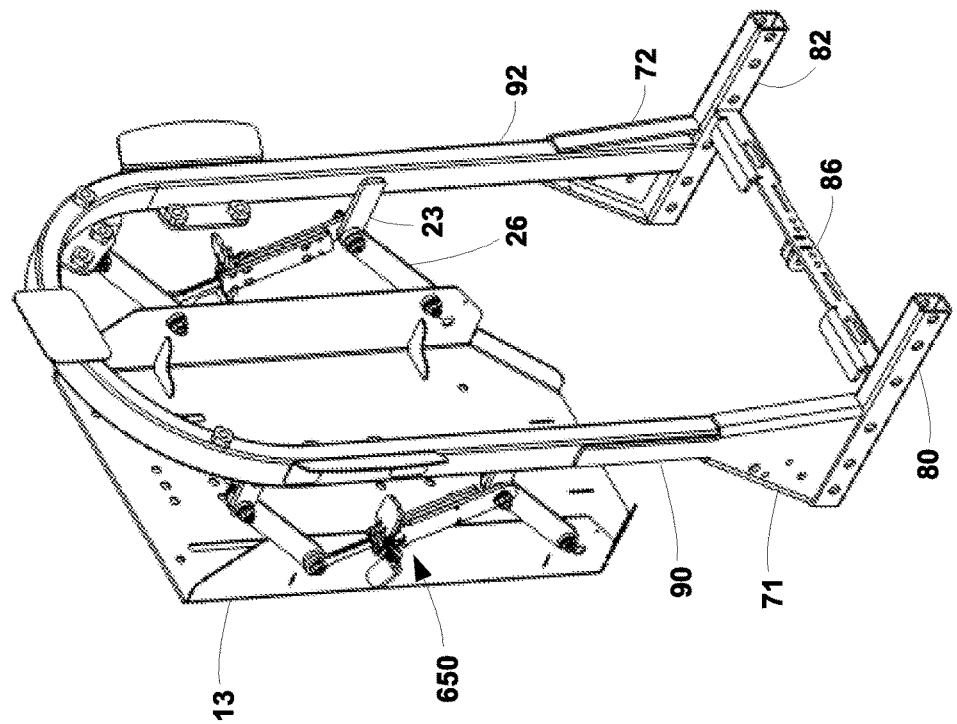
FIG. 17 is another perspective view of the portion of the emergency vehicle seat shown in FIG. 14 including the adjustable seat back assembly.
Figure 16:
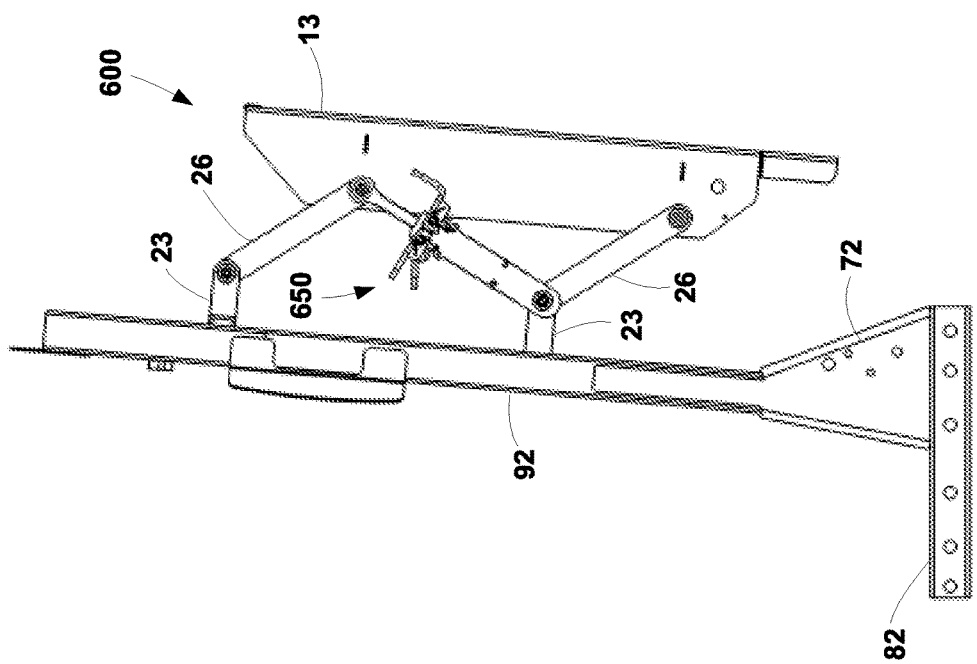
FIG. 16 is a side elevation view of the portion of the emergency vehicle seat shown in FIG. 14 including the adjustable seat back assembly.
Figure 18:
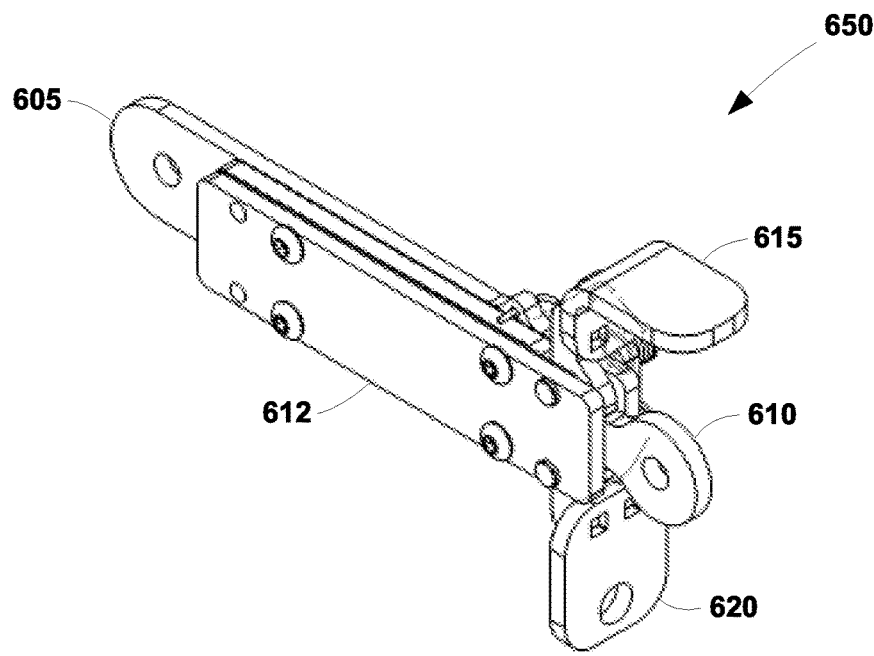
FIG. 18 is a perspective view of a ratchet assembly having a first orientation according to one or more embodiments described herein.
Figure 19:
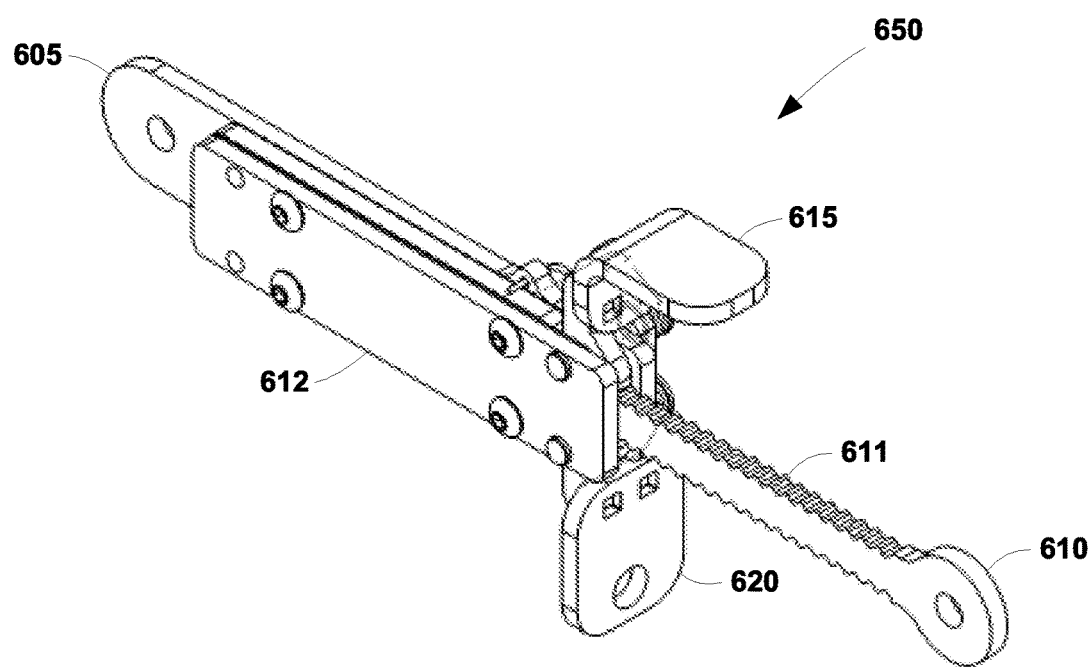
FIG. 19 is a perspective view of the ratchet assembly shown in FIG. 18, showing a ratchet shaft member in an extended position according to one or more embodiments described herein.
Figure 20:
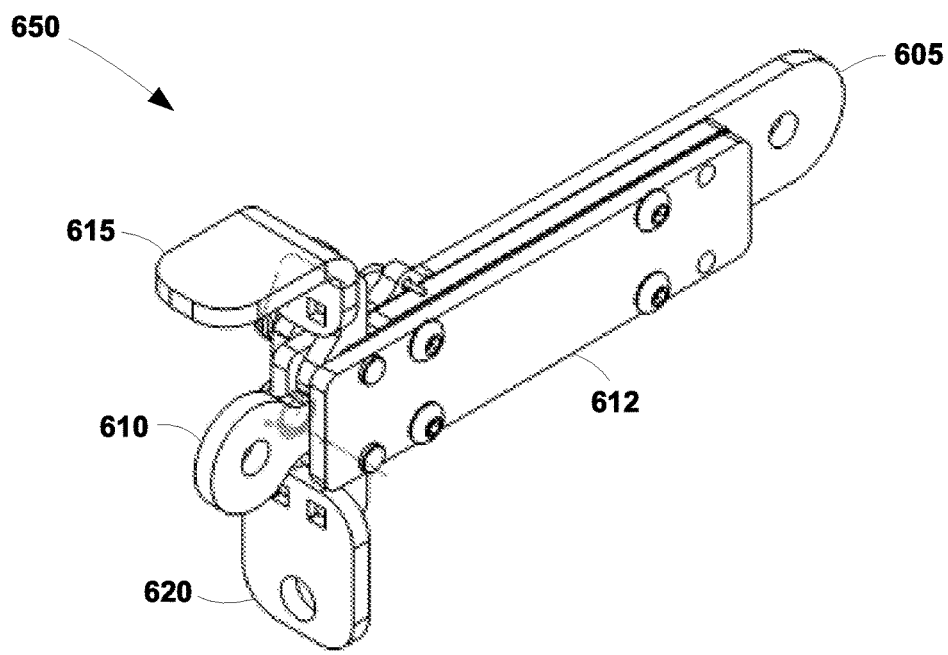
FIG. 20 is a perspective view of a ratchet assembly having a second orientation according to one or more embodiments described herein.
Figure 21:
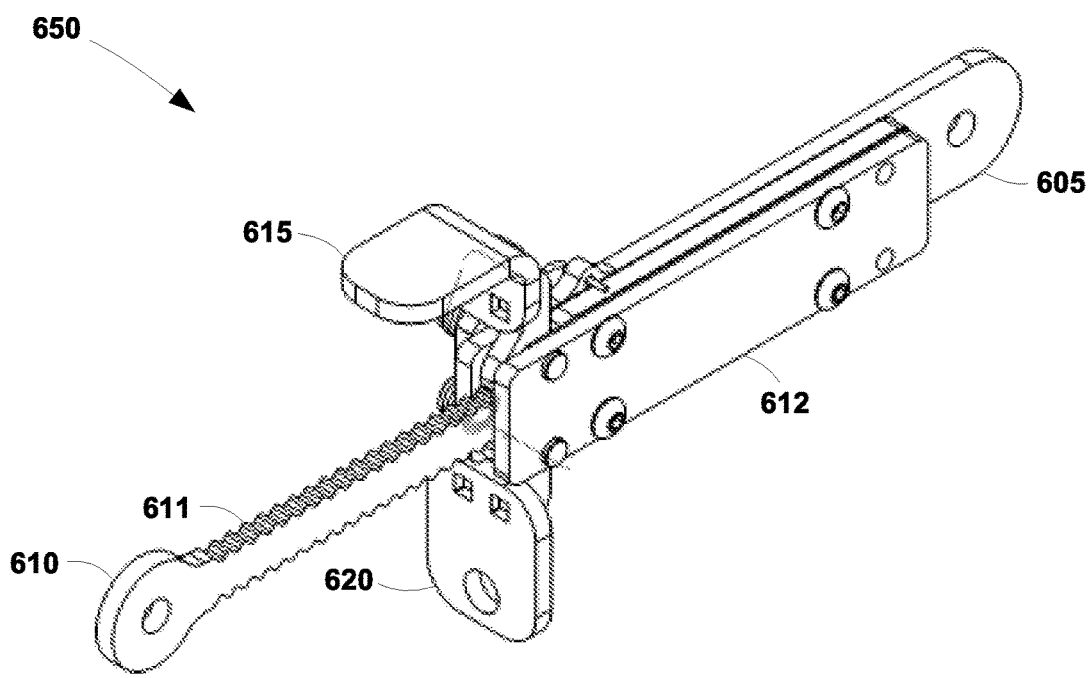
FIG. 21 is a perspective view of the ratchet assembly shown in FIG. 20, showing a ratchet shaft member in an extended position according to one or more embodiments described herein.

As shown in FIG. 10, the seat cushion 211 can flip upwards about its rearward side from a generally horizontal position (as shown in FIG. 15) to a generally vertical position. Among other advantageous, the flip-up construction of seat 210 provides an unobstructed path for emergency personnel to move through an emergency vehicle, particularly when entering and exiting the vehicle.

FIGS. 14-17 illustrate an alternate embodiment of an adjustable seat back assembly for an emergency vehicle seat according to one or more embodiments described herein. The adjustable seat back assembly 600 includes a ratchet assembly 650 that automatically adjusts a level of support provided to the occupant of the seat based on the occupant's physical characteristics (e.g., height, weight, etc.) and automatically locks into position at the adjusted level of support. Additional features of the ratchet assembly 650 are described in greater detail below with respect to FIGS. 18-25. Remaining portions of the adjustable seat back assembly 600, including horizontal hinge member 23 and traverse hinge member 26 of upper and lower hinges 31, 33 are of a similar construction, with similar functionality and features, as the adjustable seat back assembly 13 described above in connection with FIGS. 1-6.

FIGS. 18-25 illustrate a ratchet assembly 660 for use with an adjustable seat back assembly 600 of an emergency vehicle seat according to one or more embodiments described herein.

Figure 22:
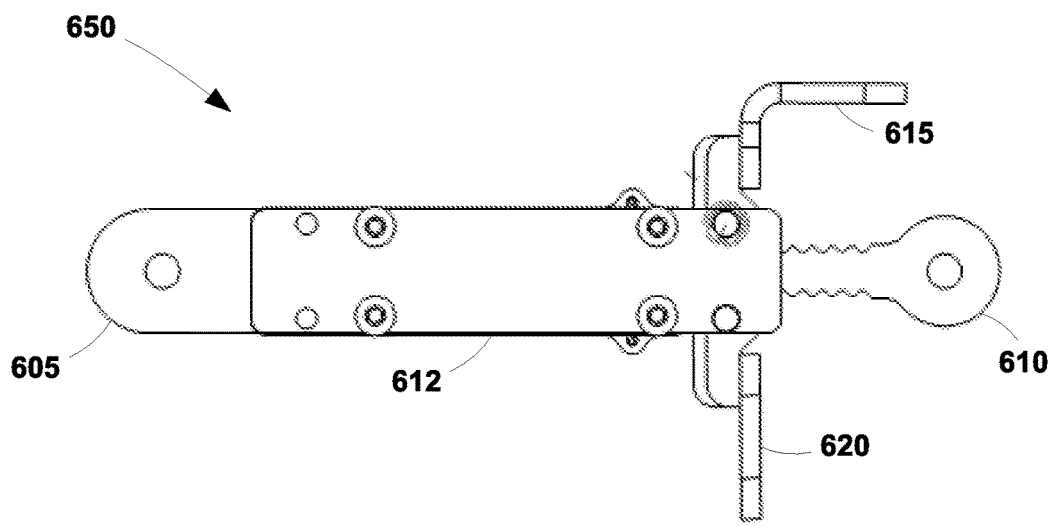
FIG. 22 is a side view of the ratchet assembly shown in FIG. 18, showing the release levers in a locked position according to one or more embodiments described herein.
Figure 23:
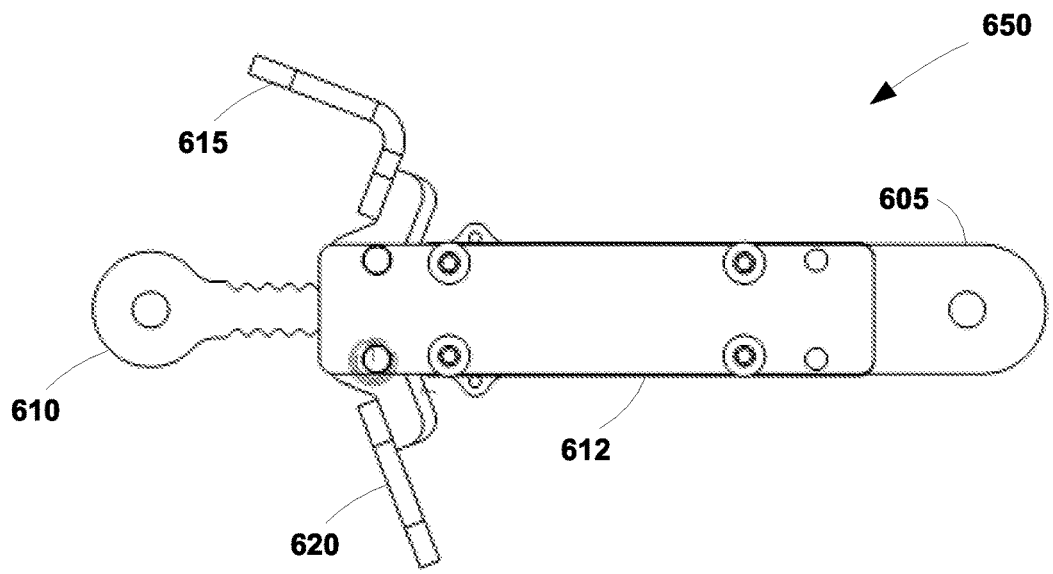
FIG. 23 is a side view of the ratchet assembly shown in FIG. 18, showing the release levers in an unlocked position according to one or more embodiments described herein.

The ratchet assembly 650 includes a mounting plate 605 and a top plate 612, connected so as to form a housing for a ratchet shaft 610 that extends outwards from the ratchet assembly 650. The ratchet assembly 600 also includes guide members 613 and 617 and spacers 614 and 616 disposed between the mounting plate 605 and top plate 612. Guide member 613 is disposed between top plate 612 and spacers 614, 616, while guide member 617 is disposed between mounting plate 605 and ratchet shaft 610. The ratchet assembly 650 also includes levers 615 and 620, which are moveable between locked and unlocked positions (as illustrated in FIGS. 22 and 23).

Figure 24:
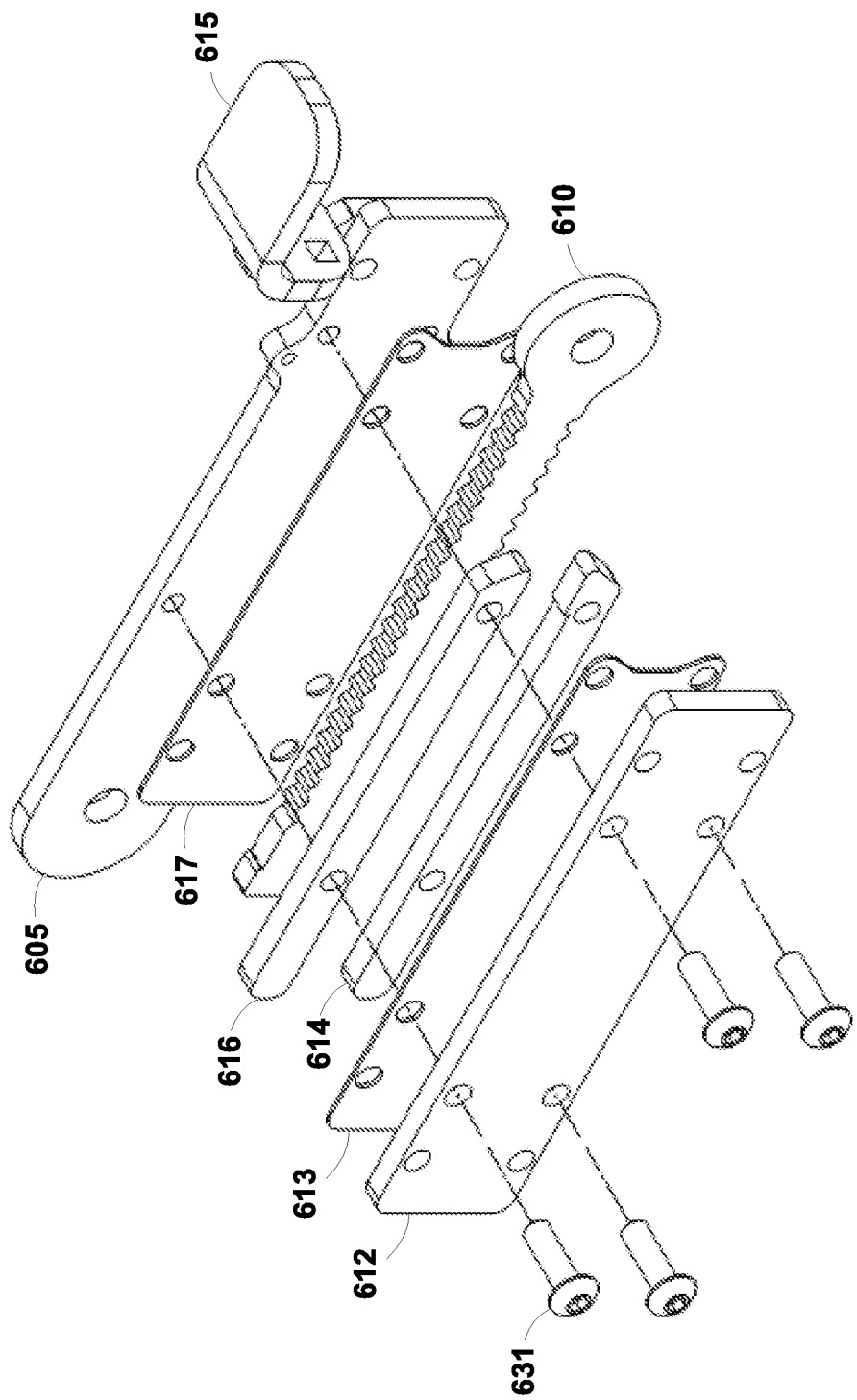
FIG. 24 is an exploded perspective view of a portion of the ratchet assembly shown in FIG. 18.
Figure 25:
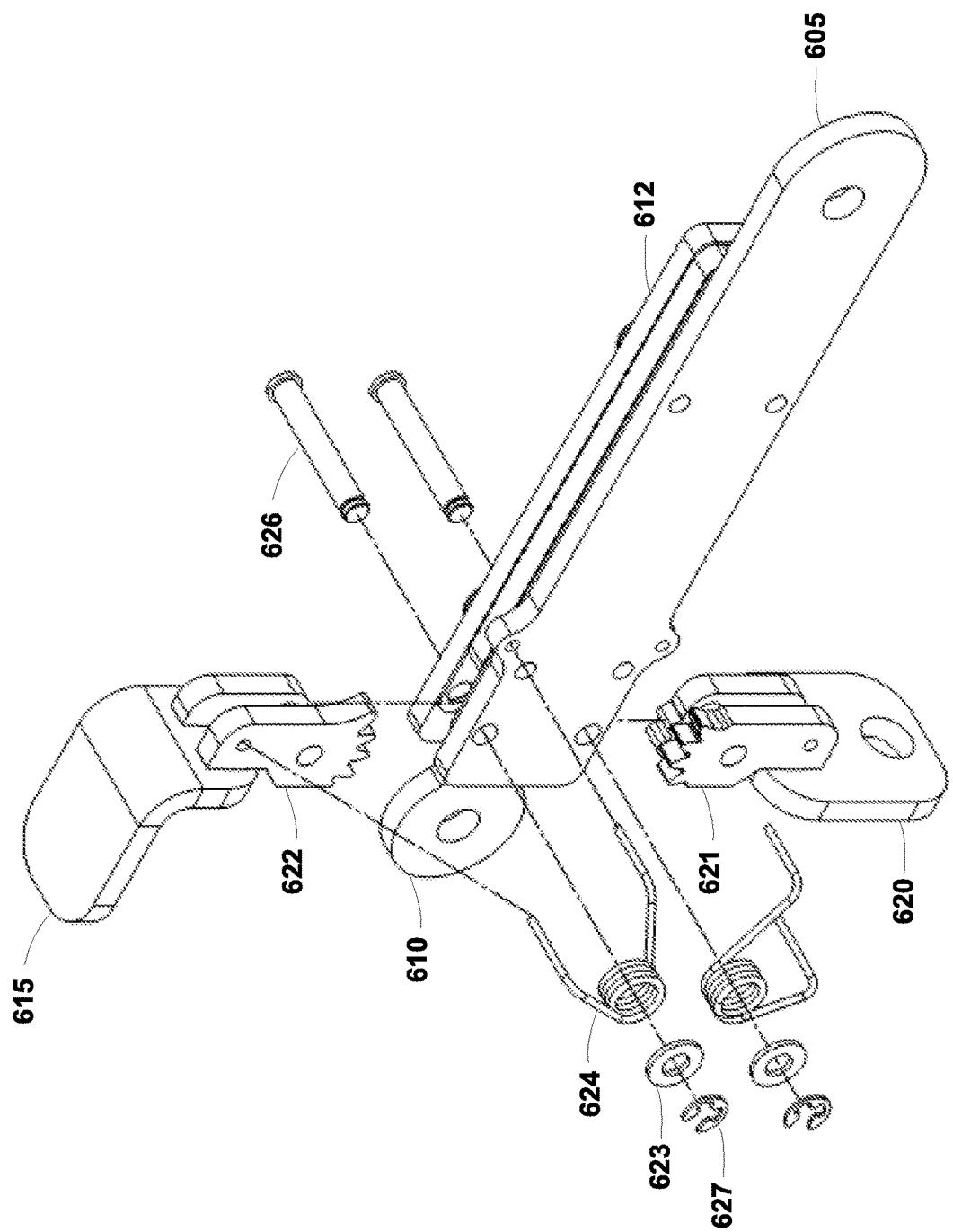
FIG. 25 is an exploded perspective view of another portion of the ratchet assembly shown in FIG. 18.
Figure 26:
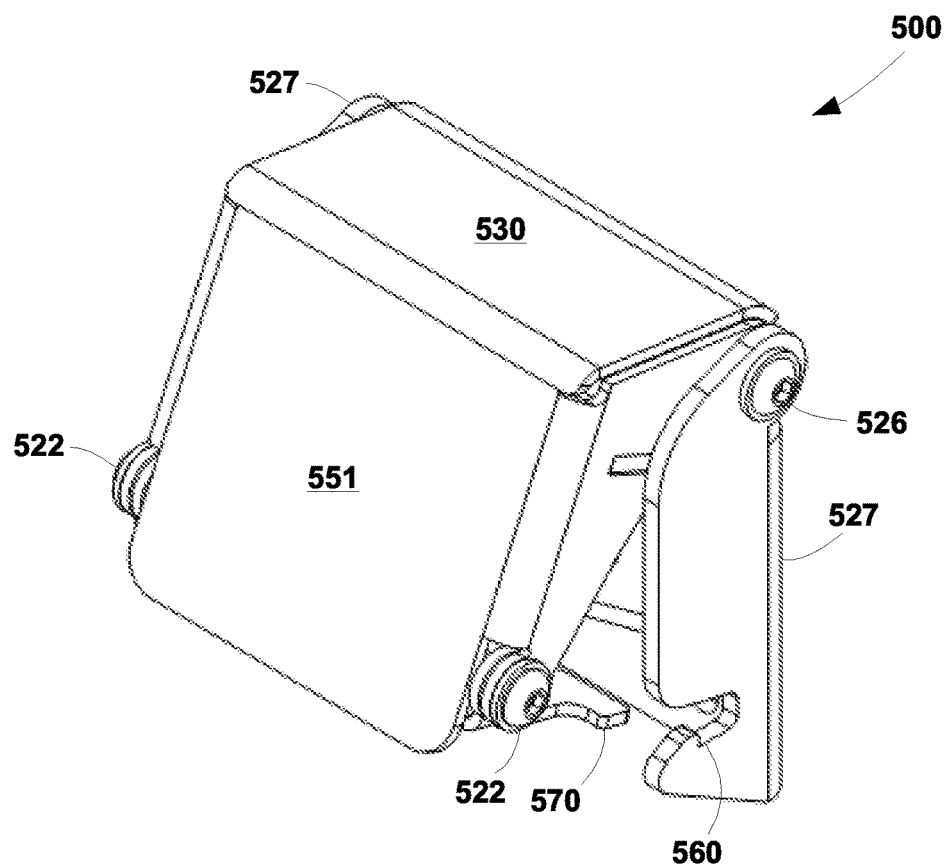
FIG. 26 is a perspective view of a release handle with a locking mechanism according to one or more embodiments described herein.
Figure 27:
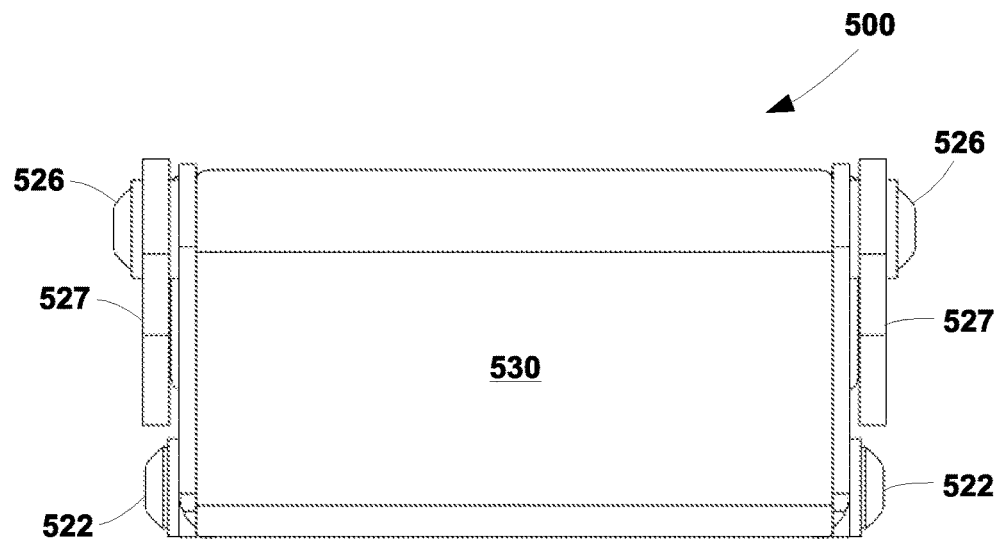
FIG. 27 is a top view of the release handle shown in FIG. 26.
Figure 28:
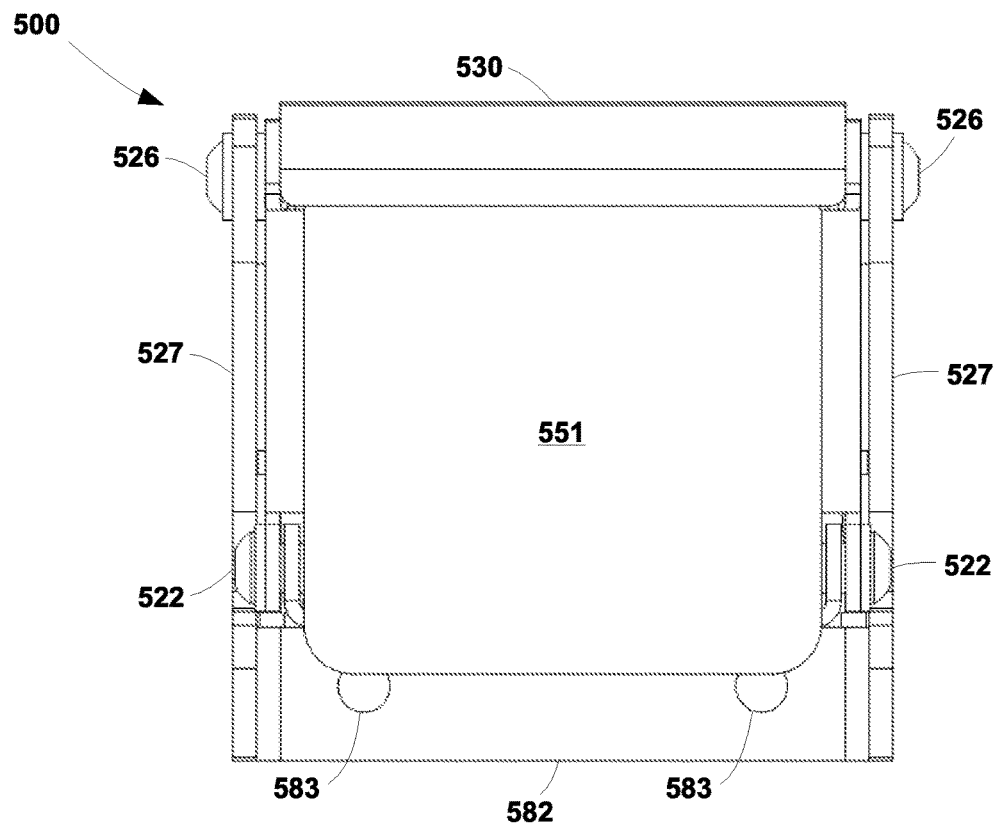
FIG. 28 is a front view of the release handle shown in FIG. 26.
Figure 29:
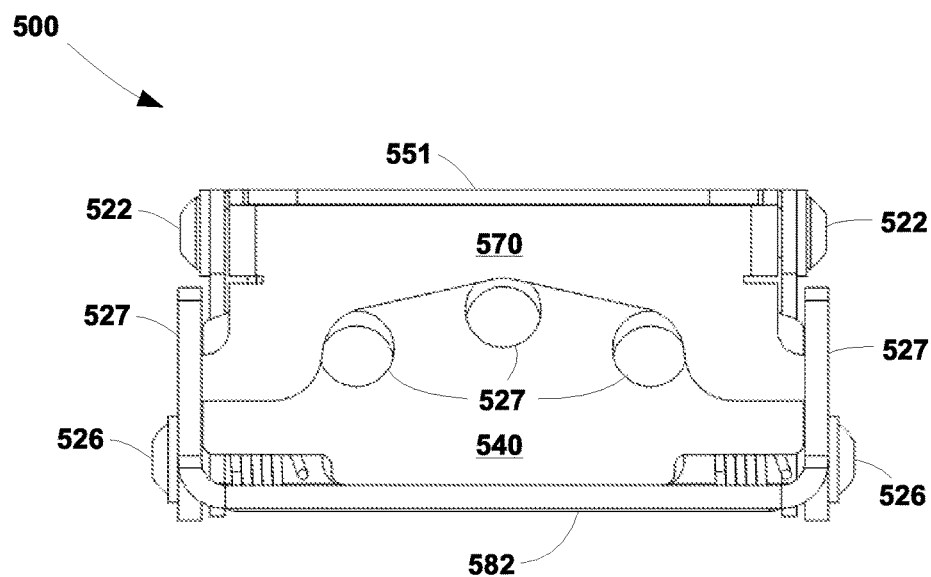
FIG. 29 is a bottom view of the release handle shown in FIG. 26.
Figure 30:
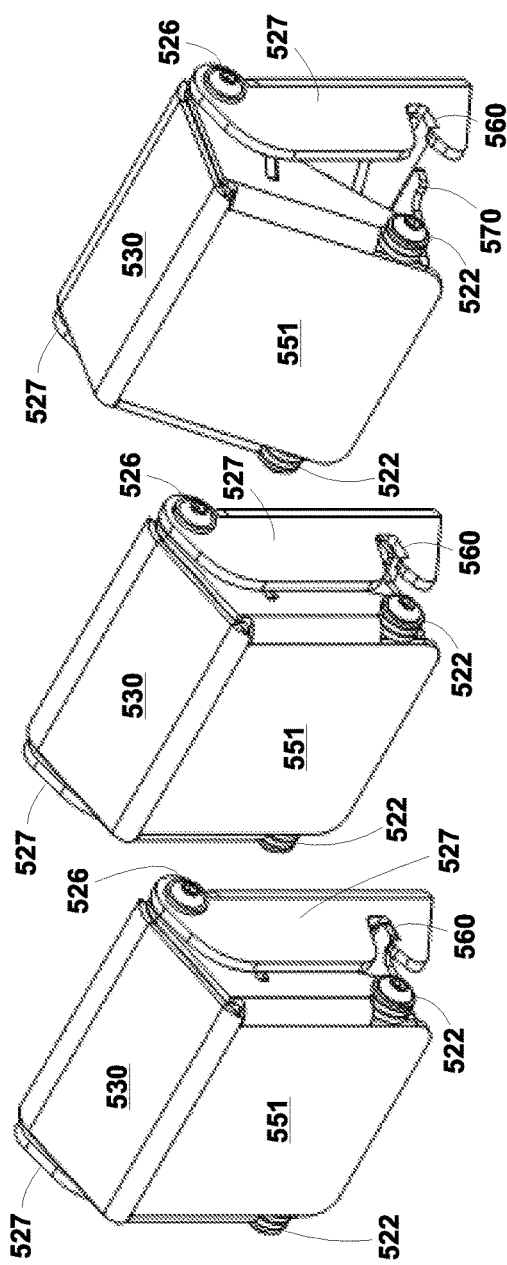
FIG. 30 is a perspective view of the release handle shown in FIG. 26, showing the locking mechanism in a fully engaged position, a partially engaged position, and a disengaged position according to one or more embodiments described herein.
Figure 31:
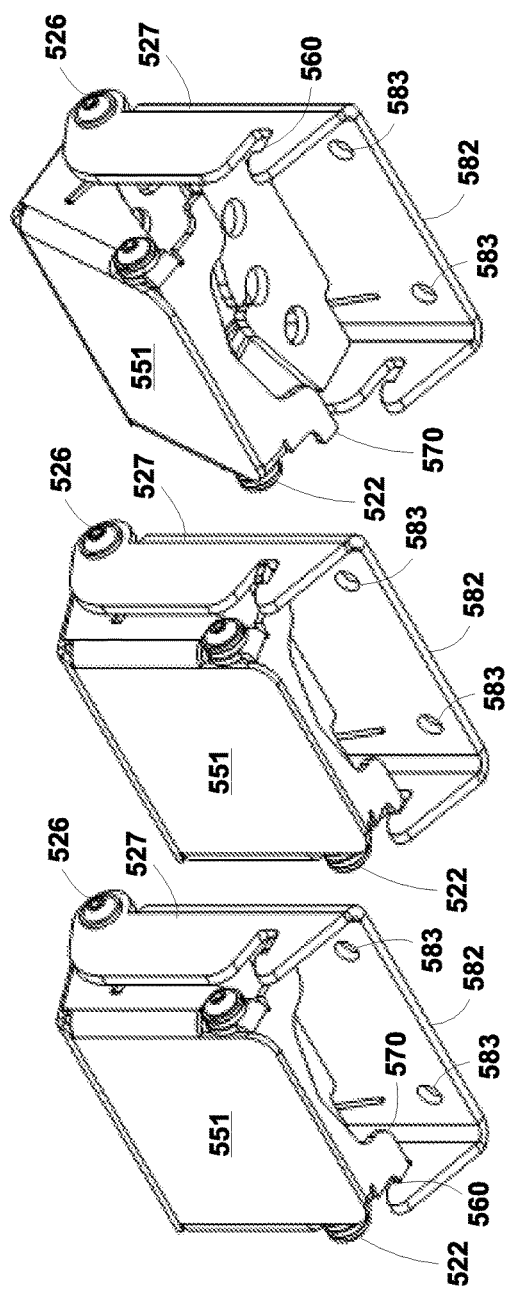
FIG. 31 is a bottom perspective view of the release handle shown in FIG. 26, showing the locking mechanism in a fully engaged position, a partially engaged position, and a disengaged position according to one or more embodiments described herein.

FIGS. 24 and 25 illustrate portions of the ratchet assembly 650 in exploded perspective views. The various components included in the portion of ratchet assembly 600 shown in FIG. 24 may be assembled together with a set of screws 631. Each of the release levers 615 and 620 has mounted thereon a gear member 621 with teeth that fit complementary to the teeth 611 of the ratchet shaft 610. Levers 615 and 620 are connected to mounting plate 605 and top plate 612 by way of spring 624, pin 626, washer 623, and ring 627.

FIGS. 26-31 illustrate an alternate embodiment of a release handle included in a multiple restraint release mechanism (e.g., multiple restraint release mechanism 50 as described above) according to one or more embodiments described herein. The release handle 500 includes a front panel 551, a top panel 530, a back panel 582 and side panels 527. The lower edge of front panel 551 can be grasped by the seat occupant and upon the occupant exerting outwards and upwards force (pulling) the front panel rotates about axis 522 while top panel 530 rotates about upper axis 526 to cause the release of multiple seat belt restraints and a bracket member of a SCBA bracket, as described above with respect to FIGS. 7 and 8. The alternate embodiment of the release handle 500 shown in FIGS. 26-31 includes a secondary locking mechanism 570 to prevent the inadvertent release of both the multiple seat belt restraints and bracket member.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments of the vehicle seats have been disclosed herein, other aspects and embodiments of the seats will be apparent to those skilled in the art. The various aspects and embodiments disclosed herein are for purposes of illustration and are not intended to be limiting, with the true scope and spirit being indicated by the following claims.

We claim:

1. A seat assembly for a vehicle, the seat assembly comprising:
   a base;
   a seat back extending up from the base, the seat back including a central recess housing a support assembly for supporting a cylindrical tank in the central recess;
   a seat belt assembly comprising at least two seat belts, a latch attached to each seat belt, and a corresponding buckle, wherein each buckle releasably engages each corresponding latch in a corresponding housing; and
   a release mechanism located remote from each housing and remote from the support assembly housed in the central recess, the release mechanism being selectively operative to enable release of the cylindrical tank from an engaged position and release of each seat belt latch from its corresponding buckle,
   wherein the release mechanism is mounted to the base of the seat and includes a locking mechanism to prevent inadvertent release of the cylindrical tank from the engaged position and inadvertent release of each seat belt latch from its corresponding buckle.

2. The seat assembly of claim 1 further comprising an adjustable seat back member connected with the seat back, wherein the adjustable seat back member automatically adjusts and locks to a depth based on pressure exerted by an occupant of the seat.

3. The seat assembly of claim 2, wherein the adjustable seat back member is a ratcheted seat back adjustment that automatically adjusts and locks to a depth based on pressure exerted by the occupant of the seat.

4. The seat assembly of claim 2, wherein the adjustable seat back member is a spring-loaded seat back adjustment that automatically adjusts and locks to a depth based on pressure exerted by the occupant of the seat.

5. The seat assembly of claim 1, wherein the release mechanism includes:
   a release cable box;
   a release mounting plate extending upwards from the release cable box; and
   a release handle fastened to the release mounting plate, the release handle operable to cause the release of the cylindrical tank from the engaged position and the release of each seat belt latch from its corresponding buckle.

6. The seat assembly of claim 5, wherein the release mechanism includes:
   a plurality of cables, a first end of each cable operatively connected to the release handle, and a second end of each cable connected to (i) one of the buckles or (ii) the support assembly housed in the central recess of the seat back.

7. The seat assembly of claim 6, wherein the release cable box is configured with a plurality of guide openings through which the plurality of cables pass.

* * * * *